US012563336B2

(12) United States Patent
Thayer et al.

(10) Patent No.: US 12,563,336 B2
(45) Date of Patent: Feb. 24, 2026

(54) RESONATOR DEVICES AND ASSEMBLIES THEREOF

(71) Applicant: SimpliSafe, Inc., Boston, MA (US)

(72) Inventors: Jordan Thayer, Hopkinton, MA (US); Rodrigo Alexei Vasquez, Medford, MA (US); Devin Walker, Somerville, MA (US); Curtis Gahimer, Indianapolis, IN (US)

(73) Assignee: SimpliSafe, Inc., Boston, MA (US)

( * ) Notice: Subject to any disclaimer, the term of this patent is extended or adjusted under 35 U.S.C. 154(b) by 343 days.

(21) Appl. No.: 18/056,390

(22) Filed: Nov. 17, 2022

(65) Prior Publication Data

US 2024/0171899 A1     May 23, 2024

(51) Int. Cl.
  *H04R 1/24*          (2006.01)
  *G06F 3/16*          (2006.01)
        (Continued)
(52) U.S. Cl.
  CPC ................ *H04R 1/24* (2013.01); *G06F 3/16* (2013.01); *H04R 1/02* (2013.01); *H04R 1/2857* (2013.01); *G08B 3/10* (2013.01)
(58) Field of Classification Search
  CPC ............. H04R 1/02–1/023; H04R 1/24; H04R 1/2857; G06F 3/16; G08B 3/10
  See application file for complete search history.

(56) References Cited

U.S. PATENT DOCUMENTS 3,778,551 A    12/1973  Grodinsky
3,819,879 A     6/1974  Baechtold
        (Continued)

FOREIGN PATENT DOCUMENTS

DE           2261122 A1    6/1973
EM    002055954-0003 S    6/2012
        (Continued)

OTHER PUBLICATIONS

Ipinazar, Paula; International Search Report and Written Opinion of the International Searching Authority dated Feb. 14, 2024; International Application No. PCT/US2023/033697; European Patent Office; Rijswijk, Netherlands.

(Continued)

*Primary Examiner* — Daniel R Sellers
*Assistant Examiner* — Tyler Michael Liebgott
(74) *Attorney, Agent, or Firm* — Stevens & Showalter LLP

(57)            ABSTRACT

An assembly including an apparatus and a device, the apparatus including a speaker configured to generate acoustic waves defining an alarm tone and a housing enclosing the speaker. The speaker is positioned within the housing such that a front chamber is between the speaker and at least one first opening of the housing, with the acoustic waves exiting through the at least one first opening. The device is coupled to the housing and includes a body having an aperture, a cavity, and at least one second opening, the cavity being positioned adjacent to the housing and configured to receive the acoustic waves through the aperture, with the acoustic waves exiting through the at least one second opening. The aperture, the cavity, and the at least one second opening are sized to collectively generate an increased output of the assembly within a frequency range of the alarm tone.

21 Claims, 20 Drawing Sheets

(51) Int. Cl.
| | | |
|---|---|---|
| *G08B 3/10* | (2006.01) | |
| *H04R 1/02* | (2006.01) | |
| *H04R 1/28* | (2006.01) | |

(56) References Cited

U.S. PATENT DOCUMENTS

| | | | | |
|---|---|---|---|---|
| 4,239,945 | A | 12/1980 | Atoji et al. | |
| 4,349,083 | A | 9/1982 | Bennett | |
| 4,698,619 | A | 10/1987 | Loeb | |
| 5,729,605 | A | 3/1998 | Bobisuthi et al. | |
| 5,844,998 | A | 12/1998 | Nageno | |
| 6,473,625 | B1 | 10/2002 | Williams et al. | |
| D640,721 | S | 6/2011 | Satine | |
| 8,130,994 | B2 | 3/2012 | Button et al. | |
| 9,027,701 | B2 | 5/2015 | Center et al. | |
| 9,143,847 | B2 | 9/2015 | Dodd | |
| 9,154,869 | B2 | 10/2015 | Cohen | |
| 9,347,798 | B1 | 5/2016 | Johnson et al. | |
| 9,485,477 | B2 * | 11/2016 | DiPoala | G08B 17/00 |
| 9,485,565 | B2 | 11/2016 | Lee et al. | |
| 9,628,900 | B2 | 4/2017 | Yang et al. | |
| 9,666,046 | B2 | 5/2017 | Lim | |
| D807,944 | S | 1/2018 | Worthington et al. | |
| 9,967,657 | B1 | 5/2018 | Wang | |
| 10,003,870 | B2 | 6/2018 | Miao | |
| D831,089 | S | 10/2018 | Laffon de Mazieres et al. | |
| 10,104,469 | B2 | 10/2018 | Jakowski | |
| 10,178,467 | B2 | 1/2019 | Hou et al. | |
| D842,358 | S | 3/2019 | Puric et al. | |
| D845,373 | S | 4/2019 | Mittleman et al. | |
| D849,080 | S | 5/2019 | Rosenberg et al. | |
| D849,088 | S | 5/2019 | Lai | |
| 10,299,030 | B2 | 5/2019 | Zhong | |
| 10,299,032 | B2 | 5/2019 | Grazian et al. | |
| 10,310,567 | B2 | 6/2019 | Kita et al. | |
| 10,348,351 | B2 | 7/2019 | Rivera | |
| 10,362,389 | B2 | 7/2019 | Proni et al. | |
| 10,418,955 | B2 * | 9/2019 | D'Penha | H04R 1/2865 |
| 10,462,553 | B2 | 10/2019 | Matsumura | |
| 10,469,953 | B2 | 11/2019 | Qin et al. | |
| 10,484,766 | B2 | 11/2019 | Huo et al. | |
| 10,490,041 | B1 | 11/2019 | Churak | |
| D871,483 | S | 12/2019 | Chang et al. | |
| 10,529,206 | B2 | 1/2020 | Sacre et al. | |
| D886,177 | S | 6/2020 | Ramones et al. | |
| 10,718,996 | B2 | 7/2020 | Ramones et al. | |
| 10,728,638 | B2 | 7/2020 | Leonhardt et al. | |
| D892,663 | S | 8/2020 | Han et al. | |
| D902,978 | S | 11/2020 | England et al. | |
| 10,863,268 | B1 | 12/2020 | Torigoe et al. | |
| 10,893,174 | B2 | 1/2021 | Li et al. | |
| D912,122 | S | 3/2021 | McManigal et al. | |
| 10,950,212 | B1 * | 3/2021 | Mathur | H04R 1/028 |
| D917,597 | S | 4/2021 | Park | |
| 11,064,621 | B1 | 7/2021 | Churak | |
| 11,076,229 | B2 | 7/2021 | Park et al. | |
| D926,857 | S | 8/2021 | Zhang | |
| 11,195,398 | B1 * | 12/2021 | Fu | G06V 20/52 |
| 11,228,832 | B2 | 1/2022 | Sim et al. | |
| 11,265,632 | B1 | 3/2022 | Au et al. | |
| 11,317,183 | B2 | 4/2022 | Shen et al. | |
| 11,317,195 | B2 | 4/2022 | Ma et al. | |
| 11,330,364 | B1 | 5/2022 | Delay et al. | |
| D954,124 | S | 6/2022 | Long | |
| D961,650 | S | 8/2022 | Kim et al. | |
| D962,322 | S | 8/2022 | Kim et al. | |
| D970,582 | S | 11/2022 | Thorne et al. | |
| D970,590 | S | 11/2022 | Thorne et al. | |
| D971,289 | S | 11/2022 | Thorne et al. | |
| 11,490,190 | B1 | 11/2022 | Leonhardt et al. | |
| D972,618 | S | 12/2022 | Li | |
| D973,123 | S | 12/2022 | Thorne et al. | |
| D973,748 | S | 12/2022 | Cai et al. | |
| D974,442 | S | 1/2023 | Li | |
| D974,446 | S | 1/2023 | Yang | |

| | | | | |
|---|---|---|---|---|
| D976,984 | S | 1/2023 | McManigal et al. | |
| 11,589,143 | B2 | 2/2023 | Yang et al. | |
| D984,510 | S | 4/2023 | Li | |
| D986,310 | S | 5/2023 | Ma | |
| D986,936 | S | 5/2023 | Zhang | |
| D996,489 | S | 8/2023 | McManigal et al. | |
| 11,893,878 | B1 | 2/2024 | Burau et al. | |
| 2004/0084244 | A1 | 5/2004 | Zurek et al. | |
| 2007/0280497 | A1 | 12/2007 | Isberg et al. | |
| 2010/0061584 | A1 | 3/2010 | Lin et al. | |
| 2012/0288107 | A1 * | 11/2012 | Lamm | H04R 25/30 |
| | | | | 381/59 |
| 2013/0170688 | A1 | 7/2013 | Cohen et al. | |
| 2014/0016813 | A1 | 1/2014 | Morris | |
| 2015/0172801 | A1 * | 6/2015 | Huang | H04R 1/2849 |
| | | | | 381/380 |
| 2015/0181322 | A1 | 6/2015 | Huang | |
| 2015/0382090 | A1 | 12/2015 | Bisset et al. | |
| 2016/0232759 | A1 * | 8/2016 | Morris | G10K 11/04 |
| 2016/0343227 | A1 * | 11/2016 | Shih | G08B 17/107 |
| 2017/0070813 | A1 | 3/2017 | Wah et al. | |
| 2018/0317020 | A1 * | 11/2018 | Abe | H04R 1/283 |
| 2021/0278880 | A1 * | 9/2021 | Chang | E05B 65/0067 |
| 2021/0306772 | A1 * | 9/2021 | Wiss | H04R 25/652 |
| 2021/0356104 | A1 | 11/2021 | Thorne et al. | |
| 2022/0232304 | A1 | 7/2022 | Au et al. | |
| 2022/0264220 | A1 | 8/2022 | Kato et al. | |
| 2022/0301532 | A1 | 9/2022 | Ott | |
| 2023/0116758 | A1 | 4/2023 | Wu et al. | |

FOREIGN PATENT DOCUMENTS

| | | |
|---|---|---|
| EM | 003119940-0002 S | 5/2016 |
| EM | 008715957-0002 S | 10/2021 |
| EM | 009203649-0001 S | 10/2022 |
| EM | 015012735-0001 S | 2/2023 |
| EP | 2613563 B1 | 6/2016 |
| EP | 2999240 B1 | 12/2018 |
| EP | 3138299 B1 | 10/2019 |
| EP | 3411861 B1 | 4/2020 |
| EP | 3669695 A2 | 6/2020 |
| EP | 3491627 B1 | 11/2020 |
| EP | 3383060 B1 | 12/2020 |
| EP | 3834184 A1 | 6/2021 |
| EP | 4027655 A1 | 7/2022 |
| EP | 4029009 A1 | 7/2022 |
| EP | 4033778 A1 | 7/2022 |
| GB | 9002055954-0003 S | 6/2012 |
| GB | 8086503000-1000 S | 5/2015 |
| GB | 9003119940-0002 S | 5/2016 |
| GB | 2577569 B | 6/2022 |
| KR | 20090096006 A | 9/2009 |
| KR | 20210067066 A | 6/2021 |
| WO | 2009060420 A1 | 5/2009 |
| WO | 2021131705 A1 | 7/2021 |

OTHER PUBLICATIONS

Kuhnen, Leila; International Search Report and Written Opinion of the International Searching Authority dated Mar. 12, 2024; International Application No. PCT/US2023/033201; European Patent Office; Rijswijk, Netherlands.

John C. Baumhauer Ph.D.; "1-Day MWM Acoustical Design Course"; MWM Acoustics; Feb. 10, 2006; pp. 61-62.

Leo L. Beranek and Tim J. Mellow; "Acoustics: Sound Fields and Transducers"; 2012; pp. 130, 135,392-395; Elsevier, Inc.; Waltham, Massachusetts, USA.

"Figure 14"; Bell Telephone Laboratories, Inc.; likely 1975.

"Figure 15"; Bell Telephone Laboratories, Inc.; 1975.

"Figure 16"; Bell Telephone Laboratories, Inc.; likely 1975.

"Figure 17"; Bell Telephone Laboratories, Inc.; likely 1975.

"Governing Equations of Wholly Acoustic System"; JCB; Bell Telephone Laboratories, Inc.; likely 1975.

F.F. Romanow; "Preface to Issue 1"; Bell Telephone Laboratories, Inc.; Aug. 1949.

F.F. Romanow; "Preface to the Second Edition"; Bell Telephone Laboratories, Inc.; Dec. 1962.

(56) References Cited

OTHER PUBLICATIONS

Indy Acoustic Research; "Frequency Response Comparison Graph"; 2019.

Curtis Gahimer; "Speaker Device"; U.S. Appl. No. 17/935,972 filed Sep. 28, 2022.

Scott Thorne; "Resonator Device"; U.S. Appl. No. 29/868,042 filed Nov. 17, 2022.

Thorne, Scott; Design U.S. Appl. No. 29/912,445 entitled "Resonator Device"; filed Sep. 19, 2023; United States Patent and Trademark Office; Alexandria, Virginia.

Thorne, Scott; Design U.S. Appl. No. 29/912,972 entitled. "Camera With Integrated Resonator"; filed on Sep. 26, 2023; United States Patent and Trademark Office; Alexandria, Virginia.

Gahimer, Curtis; Related U.S. Continuation In-Part U.S. Appl. No. 18/474,539 entitled "Speaker Device"; filed on Sep. 26, 2023; United States Patent and Trademark Office; Alexandria, Virginia.

Philips Hue Secure Wired Camera; https://www.philips-hue.com/en-us/products/all-products/product-page/secure-cameras#overview; 2023.

Gahimer, Curtis; PCT Application No. PCT/US2023/028445 for Speaker Device; filed Jul. 24, 2023; United States Patent and Trademark Office; Alexandria, Virginia.

Thayer, Jordan; PCT Application No. PCT/US2023/033201 for Resonator Devices and Assemblies Thereof; filed Sep. 20, 2023; United States Patent and Trademark Office; Alexandria, Virgina.

Gahimer, Curtis; PCT Application No. PCT/US2023/033697 for Speaker Device; filed Sep. 26, 2023; United States Patent and Trademark Office; Alexandria, Virginia.

Le, Huyen D.; Non-Final Rejection dated Feb. 27, 2024; Continuation U.S. Appl. No. 18/474,539; United States Patent and Trademark Office; Alexandria, Virginia.

Gahimer, Curtis; Related Divisional U.S. Appl. No. 18/755,878 entitled "Speaker Device" filed Jun. 27, 2024; United States Patent and Trademark Office; Alexandria, Virginia.

Le, Huyen D.; Notice of Allowance and Fees Due dated May 23, 2024; U.S. Appl. No. 18/474,539; United States Patent and Trademark Office; Alexandria, Virginia.

Yu, Norman; Non-Final Rejection dated May 30, 2024; U.S. Appl. No. 17/935,972; United States Patent and Trademark Office; Alexandria, Virginia.

Exner, Karin; International Search Report and Written Opinion dated Nov. 10, 2023; International Application No. PCT/US2023/028445; European Patent Office; Rijswijk, Netherlands.

Exner, Karin; Invitation to Pay Additional Fees, and Where Appliclcable, Protest Fees dated Nov. 17, 2023; International Application No. PCT/US2023/033697; European Patent Office; Rijswijk, Netherlands.

Kuhnen, Leila; Invitation to Pay Additional Fees, and Where Appliclcable, Protest Fees dated Jan. 19, 2024; International Application No. PCT/US2023/033201; European Patent Office; Rijswijk, Netherlands.

Gahimer, Curtis; Related Continuation U.S. Appl. No. 18/782,355 entitled "Speaker Device" filed Jul. 24, 2024; United States Patent and Trademark Office; Alexandria, Virginia.

Le, Huyen D.; Notice of Allowance and Fees Due dated Jul. 24, 2024; U.S. Appl. No. 18/474,539; United States Patent and Trademark Office; Alexandria, Virginia.

Yu, Norman; Non-Final Office Action dated Jan. 28, 2025; U.S. Appl. No. 17/935,972; United States Patent and Trademark Office; Alexandria, Virginia.

Curtis Gahimer et al.; Continuation U.S. Appl. No. 18/987,611 entitled "Speaker Device"; Dec. 19, 2024; United States Patent and Trademark Office; Alexandria, Virginia.

Chatel, Cecile; International Preliminary Report on Patentability dated Apr. 10, 2025; International Application No. PCT/US2023/028445; The International Bureau of WIPO; Geneva, Switzerland.

Lee, Sun Hwa; International Preliminary Report on Patentability; dated Apr. 10, 2025; International Application No. PCT/US2023/033697; The International Bureau of WIPO; Geneva, Switzerland.

Collado, Rico E.; Substantive Examination Report dated Aug. 6, 2025; Philippines Application No. 1-2025-550698; Intellectual Property Office of the Philippines; Taguig City, Philippines.

Le, Huyen D.; Non Final Office Action dated Jan. 12, 2026; U.S. Appl. No. 18/755,878; United States Patent and Trademark Office; Alexandria, Virginia.

* cited by examiner

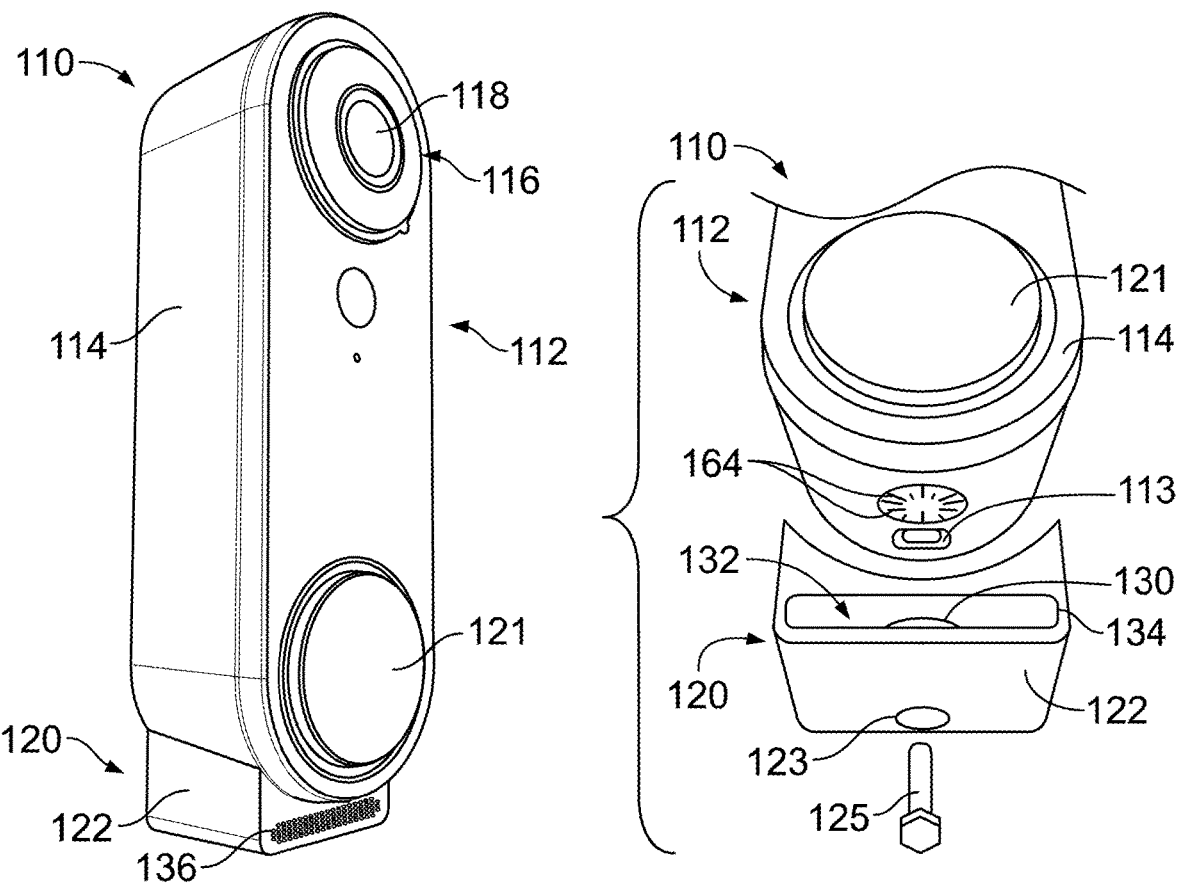
FIG. 3A            FIG. 3B
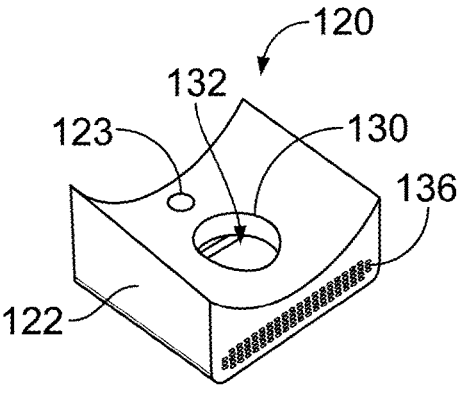
FIG. 3C

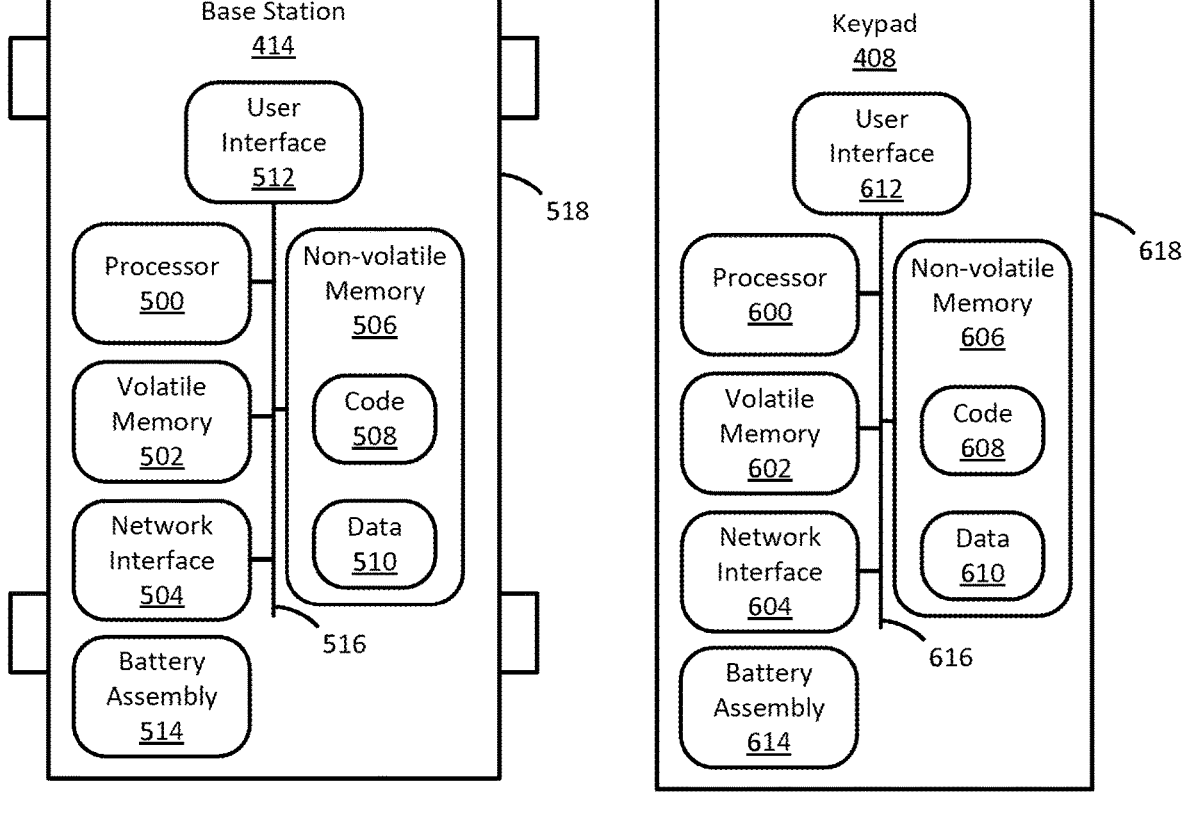
FIG. 12                    FIG. 13

RESONATOR DEVICES AND ASSEMBLIES THEREOF

FIELD

The present disclosure is directed to resonator devices and assemblies thereof for increasing the output of audible sound at a particular frequency or frequency range.

BACKGROUND

Many devices, such as outdoor security cameras and doorbell cameras, include a housing that incorporates a speaker and defines an internal front chamber positioned in front of the speaker. Openings in housings of such devices allow acoustic waves to exit the housing.

SUMMARY OF THE DISCLOSURE

In one aspect of the present disclosure, an assembly is provided that comprises an apparatus and a device. The apparatus may comprise a speaker including a diaphragm configured to generate acoustic waves defining an alarm tone; and a housing enclosing the speaker and including at least one first opening. The speaker may be positioned within the housing such that a front chamber is between the diaphragm and the at least one first opening, in which the acoustic waves exit from the apparatus through the at least one first opening. The device may be coupled to the housing and may comprise a body having an aperture, a cavity, and at least one second opening. The cavity may be positioned adjacent to the housing and configured to receive the acoustic waves through the aperture, with the acoustic waves exiting from the device through the at least one second opening. The aperture, the cavity, and the at least one second opening may be sized to collectively generate an increased output of the assembly within a frequency range of the alarm tone.

A combination of the apparatus and the device may define a resonator having a resonance frequency that is within the frequency range of the alarm tone.

The front chamber and the cavity may be coupled so that the at least one first opening, the aperture, and the at least one second opening are configured to collectively generate, with the front chamber and the cavity, a peak output of the assembly within the frequency range of the alarm tone.

The at least one first opening may comprise a plurality of openings, the at least one second opening comprises a plurality of openings, or the at least one first opening and the at least one second opening both comprise a plurality of openings.

The frequency range of the alarm tone falls within a range from 2.0 kHz to 4.0 kHz.

The acoustic waves may further comprise speech.

In another aspect of the present disclosure, an assembly is provided that comprises a loudspeaker configured to generate acoustic waves, and a device positioned adjacent to the loudspeaker. The device may comprise a body having an aperture, a cavity, and at least one opening, in which the aperture may be configured to receive the acoustic waves from the loudspeaker in a first direction, and the cavity may be configured to redirect the acoustic waves through the at least one opening in a second direction different from the first direction.

The cavity may comprise a curved portion positioned opposite the at least one opening.

The second direction may be oriented at an angle of between 1° to 90° with respect to the first direction.

The acoustic waves may define an alarm tone and the assembly may be configured to increase a sound pressure output level of the assembly within a frequency range of the alarm tone.

The assembly may further comprise a housing that encloses the loudspeaker and includes a camera and a camera lens that captures light along an optical axis, in which the second direction is substantially parallel to the optical axis.

The device may further comprise a mounting structure configured to mount the body to a housing located between the body and the loudspeaker. The mounting structure may comprise a retention ring configured to fit over a portion of the housing. The housing may comprise an opening and the mounting structure may comprise one or more retention clips configured to be received in an opening of the housing. The mounting structure may comprise one or more second apertures formed in the body and one or more fasteners configured to be received in the one or more second apertures.

In a further aspect of the present disclosure, a method includes providing an apparatus comprising a speaker and a housing, the speaker configured to generate acoustic waves defining an alarm tone, and the housing enclosing the speaker and including at least one first opening, the at least one first opening being located within the housing such that a front chamber is defined between the speaker and the at least one first opening, in which the acoustic waves exit from the apparatus through the at least one first opening; providing a device including a body, the body having an aperture, a cavity, and at least one second opening; and positioning the apparatus relative to the device to enable the cavity to receive through the aperture the acoustic waves generated by the speaker and allow the acoustic waves to exit from the device through the at least one second opening, so that the aperture, the cavity and the at least one second opening collectively create, with the front chamber and the at least one first opening, a resonator that generates an increased output of the assembly within a frequency range of an output of the speaker corresponding to the alarm tone.

The front chamber and the at least one first opening may collectively define a first resonator when the apparatus is used without the device and the resonator defined by the front chamber, the at least one first opening, the aperture, the cavity, and the at least one second opening may comprise a second resonator. The method may further comprise: prior to positioning the apparatus relative to the device, determining a resonance frequency of the first resonator, in which the resonance frequency of the first resonator is different from the resonance frequency of the second resonator and does not fall within the frequency range of the output of the speaker corresponding to the alarm tone; and based on the resonance frequency of the first resonator, altering the body to raise or lower the resonance frequency of the second resonator, such that the resonance frequency of the second resonator falls within the frequency range of the output of the speaker corresponding to the alarm tone.

The method may further comprise defining one or more parameters of the device such that the aperture, the cavity, and the at least one second opening collectively create, with the front chamber and the at least one first opening, the resonator that generates the increased output of the assembly within the frequency range of the output of the speaker corresponding to the alarm tone.

The at least one second opening may comprise a slot and a plurality of openings, in which the one or more parameters comprise at least one of a volume of the cavity, a length of the slot, or a length of the plurality of the openings, the method further comprising: when the resonance frequency is to be decreased, increasing at least one of the volume of the cavity, the length of the slot, or the length of the plurality of the openings; and when the resonance frequency is to be increased, decreasing at least one of the volume of the cavity, the length of the slot, or the length of the plurality of the openings. In another example, the one or more parameters may comprise at least one of a cross-sectional area of the slot, a diameter of the plurality of openings, or a number of the plurality of openings, the method further comprising: when the resonance frequency is to be decreased, decreasing at least one of the cross-sectional area of the slot, the diameter of the plurality of openings, or the number of the plurality of openings; and when the resonance frequency is to be increased, increasing at least one of the cross-sectional area of the slot, the diameter of the plurality of openings, or the number of the plurality of openings.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale. Aspects of the present disclosure are described with reference to the following drawings in which numerals reference like elements, and in which:

FIG. 3A is a perspective view of another assembly comprising an optical apparatus and a resonator device in accordance with the present disclosure.

FIG. 3B is a partially exploded bottom view of the assembly of FIG. 3A.

FIG. 3C is a top perspective view of the resonator device of FIG. 3A.

FIG. 12 is a schematic diagram of a base station, according to some examples described herein.

FIG. 13 is a schematic diagram of a keypad, according to some examples described herein.

DETAILED DESCRIPTION

Figure 1:
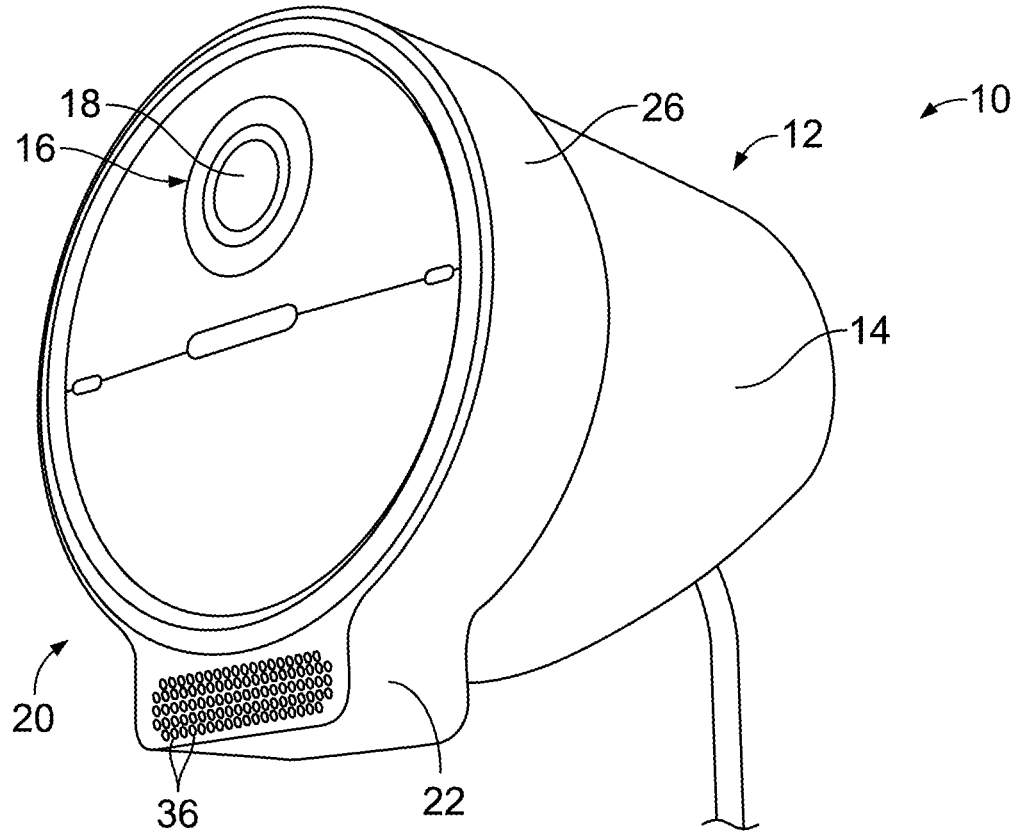
FIG. 1 is a perspective view of an assembly comprising an optical apparatus and a resonator device in accordance with the present disclosure.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Many conventional apparatuses and assemblies contain speakers and are used to generate an alarm tone. However, these conventional apparatuses and assemblies often are unable to generate output of a sufficient sound pressure level, particularly across a broader frequency range of, for example, 400 Hz to 4.0 kHz, due at least in part to inherent limitations in the structure of the speaker and/or the apparatus/assembly and/or natural resonance frequencies of the components of the apparatus/assembly that do not match the desired frequency range. In accordance with the present disclosure, a device is configured to selectively increase a sound pressure level of the output of an assembly including the device corresponding to an alarm tone, while also being capable of generating sound corresponding to speech at a sufficient sound pressure level such that the sound corresponding to speech is audible to the average person.

The present disclosure provides a solution for improving a sound pressure level of an output of an assembly containing an apparatus and a device in a manner that minimizes substantial changes to the apparatus and avoids use of electronic amplification. In particular, the improved output occurs at a desired frequency or frequency range, yet does not substantially reduce the output of the assembly at frequencies below the desired frequency or frequency range. In one example, the desired frequency or frequency range may correspond to an alarm tone, such that the output of the assembly is increased at the desired frequency or frequency range corresponding to the alarm tone. This increase in output is achieved by configuring the assembly to generate or define a Helmholtz resonator having a resonance frequency at or near a frequency or frequency range of the alarm tone. The improved output may be augmented by configuring the device to allow acoustic waves to enter the device in a first direction and redirect the acoustic waves in a second direction so that the acoustic waves are directed in a direction toward individuals who are intended to hear the sound.

Figure 2:
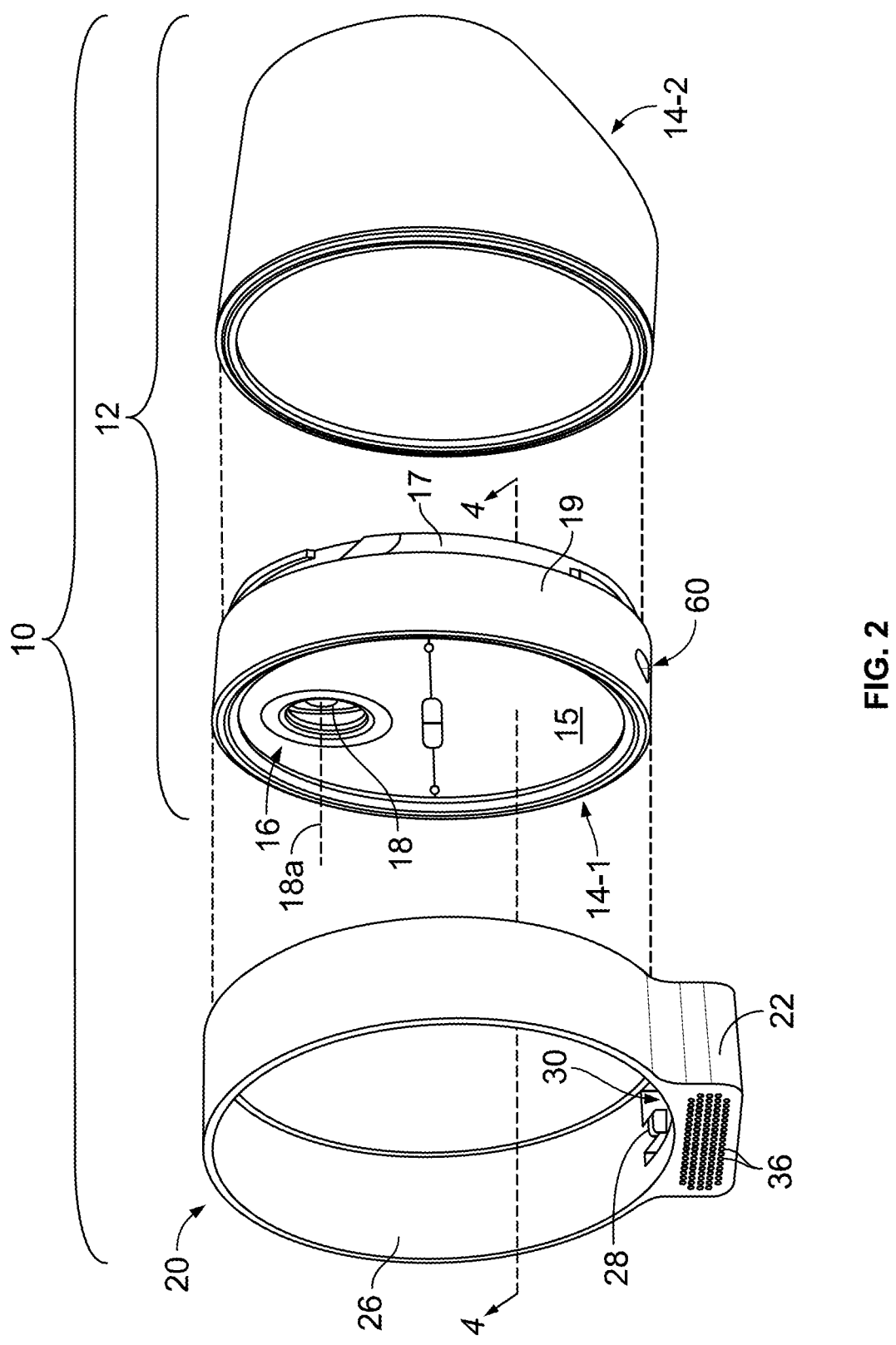
FIG. 2 is a partially exploded view of the assembly of FIG. 1.
Figure 4:
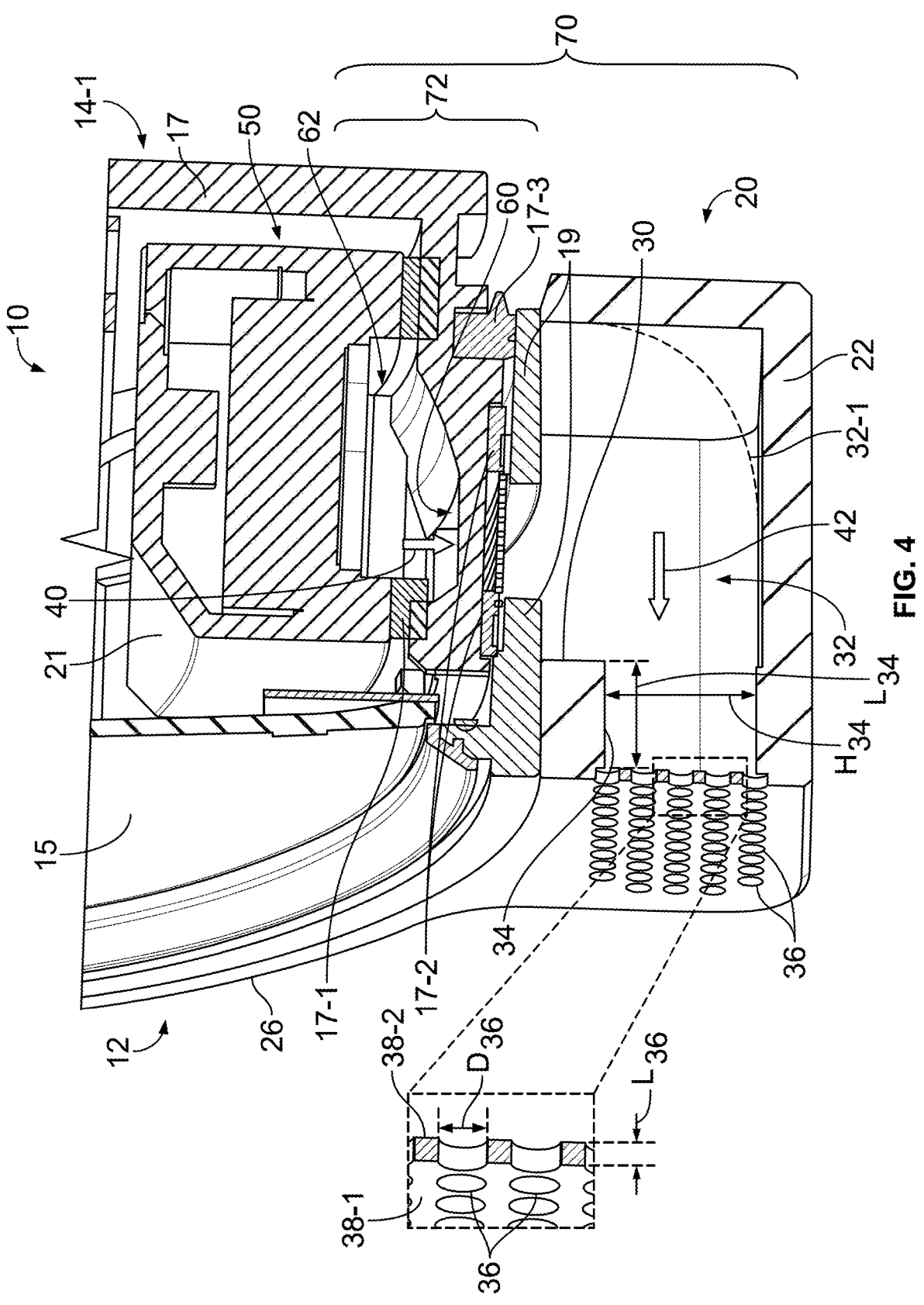
FIG. 4 is a perspective cross-sectional, partially exploded view of the resonator device and a portion of the optical apparatus of FIG. 2 taken along line 4-4.

FIGS. 1, 2, and 4 show an exemplary assembly 10 (e.g., an indoor or outdoor camera) in accordance with the present disclosure. The assembly 10 may comprise an apparatus comprising an optical apparatus 12. The optical apparatus 12 may comprise a housing 14 that includes a first portion 14-1 that is removably engageable with a second portion 14-2. The first portion 14-1 may be arranged as a cap and may comprise a front face 15, an inner component 17, and an outer component 19 that receives and engages the front face 15 and inner component 17.

The optical apparatus 12 may include an optical component 16. The optical component 16 may be positioned within the first portion 14-1 of the housing 14. The optical component 16 can include one or more elements for performing a desired optical function. In the example shown, the optical component 16 comprises a transparent region (e.g., an optical lens 18, opening, filter, light pipe or waveguide, etc.)

through or via which light can be conducted or enter. The optical lens 18 may allow the optical apparatus 12 to receive light or otherwise capture image data along an optical axis 18*a*. In some examples, the optical apparatus 12 comprises a camera and the optical lens 18 is a camera lens. The optical apparatus 12 also includes a speaker 50 (shown in FIG. 4), as described herein in detail. The optical apparatus 12 may further include additional elements (not shown), such as an imaging device (e.g., a CCD, CMOS, photosensor, or other light sensitive element for detecting light transmitted via the transparent portion), a LED or other light emitter, an audio component (e.g., a microphone to record audio to be combined with video data, a speaker, etc.), and so on.

The second portion 14-2 of the housing 14 may be arranged as a canister housing and can be arranged to support the optical apparatus 12 and the components thereof (internal components are removable from the second portion 14-2 of the housing 14 in FIG. 2). The second portion 14-2 of the housing 14 may comprise a mounting structure (not shown) that can be used to arrange the optical apparatus 12 on a wall, post, or other structural support.

With continued reference to FIGS. 1, 2, and 4, the assembly 10 may further comprise a resonator device 20. The resonator device 20 may comprise a body 22 that is coupled to the housing 14 of the optical apparatus 12. In some examples, the resonator device 20 may be retrofitted to the housing 14 of an existing optical apparatus 12. The body 22 may have one or more mounting structures, in which the mounting structure(s) are configured to mount the body 22 to the housing 14 of the optical apparatus 12. The mounting structure(s) may comprise one of, or any combination of, the mounting structures described herein. In the example shown in FIGS. 1, 2, and 4, the mounting structure comprises a retention ring 26 that is configured to fit over a portion of the housing 14 of the optical apparatus 12. The retention ring 26 may comprise a material similar to the housing 14 of the optical apparatus 12, e.g., a rigid material such as a plastic, polymer or composite material, and may be configured to secure the body 22 to the optical apparatus 12, at least in part, via a friction or snap fit, an adhesive, and/or one or more fasteners. In other examples (not shown), the retention ring 26 may comprise an elastic material. In the example shown in FIGS. 2 and 6, the mounting structure may optionally comprise one or more retention clips 28 that are configured to be received in an opening, e.g., opening 60, in the housing 14 of the optical apparatus 12, e.g., via a snap fit. In other examples (not shown), it is contemplated that the housing 14 and body 22 may be integral with one another.

FIGS. 3A-3C show another exemplary assembly 110 (e.g., a video doorbell) in accordance with the present disclosure. The assembly 110 may comprise an apparatus including an optical apparatus 112 (e.g., a camera) and a resonator device 120. The optical apparatus 112 may comprise a housing 114 that includes an optical component 116. The optical component 116 may be substantially similar to the optical component 16 depicted in FIGS. 1 and 2 and can include an optical lens 118 and one or more additional components. As described herein, the optical apparatus 112 also includes a speaker (not visible). A mounting structure (not shown) may be used to arrange the optical apparatus 112 on a wall, post, or other structural support. The assembly 110 may be, for example, a doorbell with a button 121 that may be depressed to produce a chime. The resonator device 120 may be substantially similar to the resonator device 20 shown in FIGS. 1, 2, and 4 and may comprise a body 122 that is coupled to the housing 114 of the optical apparatus 112. The body 122 may have a mounting structure that is configured to mount the body 122 of the resonator device 120 to the housing 114 of the optical apparatus 112. As shown in FIGS. 3B and 3C, the mounting structure may comprise one or more apertures 123 (also referred to herein as one or more second apertures) formed in and extending through a thickness of the body 122 of the resonator device 120 and one or more fasteners 125, in which the fastener(s) 125 are configured to be received in, and extend through, the aperture(s) 123. The fastener(s) 125 are received in one or more corresponding apertures 113 formed in the housing 114 of the optical apparatus 112.

In some examples, the mounting structure aligns the resonator device 20, 120 with respect to the optical apparatus 12, 112 and secures the resonator device 20, 120 to the optical apparatus 12, 112. The resonator device 20, 120 may fit tightly over and/or to the housing 14, 114 of the optical apparatus 12, 112 and can be positioned so as to avoid interfering with the field of view of the optical component 16, 116.

Figure 5:
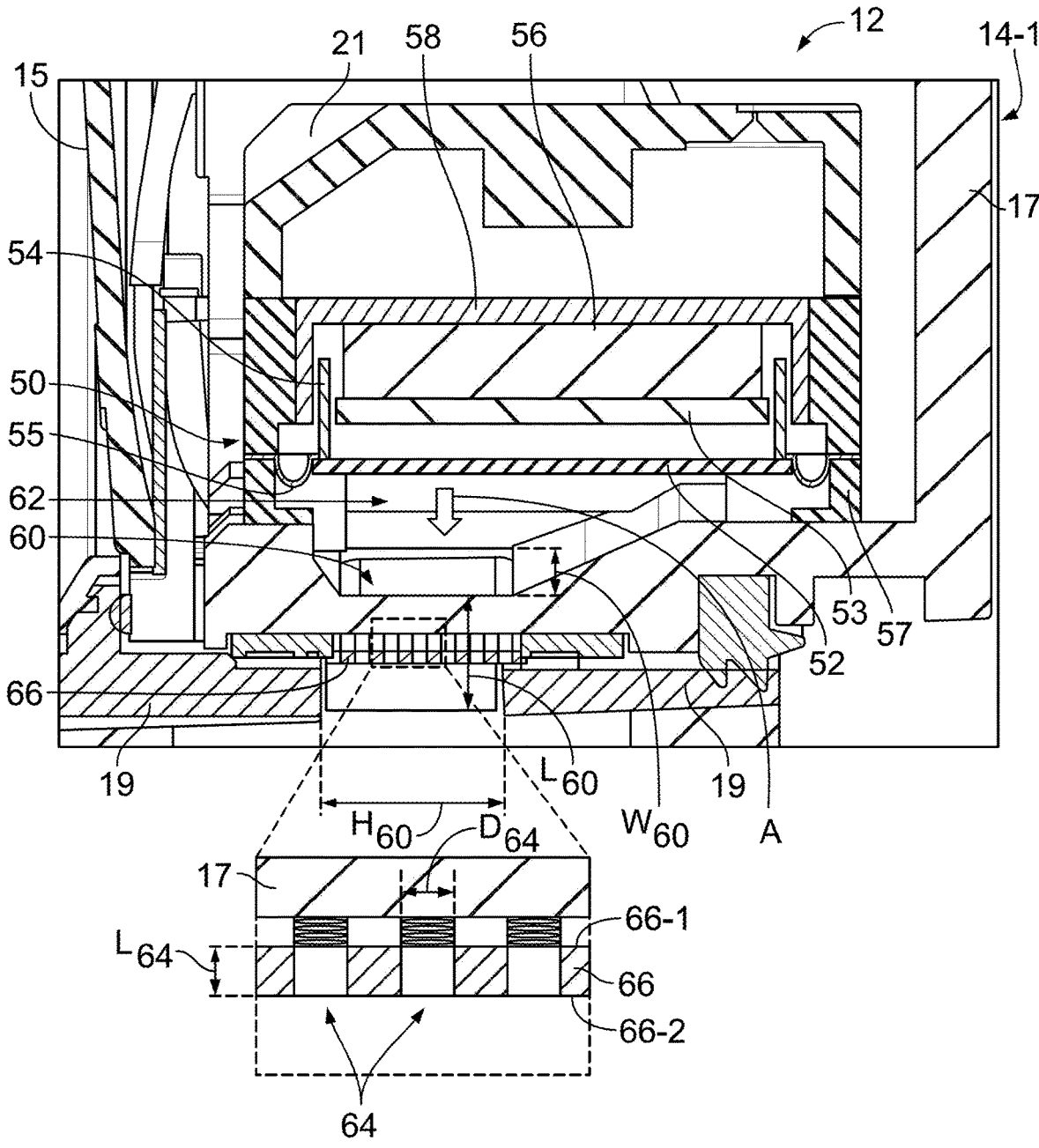
FIGS. 5 and 6 are detailed views of portions of FIG. 4.

With reference to FIGS. 4 and 5, the housing 14, specifically the first portion 14-1 of the housing 14, of the optical apparatus 12 includes a speaker enclosure 21 that encloses a speaker 50 (e.g., a loudspeaker; the speaker 50 is shown in outline in FIG. 4). The first portion 14-1 of the housing 14 includes at least one opening 60 (also referred to herein as at least one first opening; also visible in FIG. 2) that extends through the inner and outer components 17, 19 of the first portion 14-1 of the housing 14. As shown in the detailed view of FIG. 5, the speaker 50 may be a microspeaker and includes a diaphragm 52, a top plate 53, a voice coil 54, a surround 55, one or more magnets 56, a frame 57, and a yoke or back plate 58. The speaker 50 is configured to generate sound, specifically acoustic waves defining an alarm tone. An electronic audio signal, which could be a wireless audio signal, may be supplied to the speaker 50, which converts the audio signal to sound in the form of acoustic waves. The electronic audio signal passes through the voice coil 54, causing an electro-magnetic field to be produced, which interacts with a field produced by the magnets 56. This interaction causes the voice coil 54 and the diaphragm 52, which is attached to the voice coil 54, to move together. Movement of the diaphragm 52 causes a disturbance in the air surrounding it and thus produces acoustic waves. The acoustic waves generated by the speaker 50 generally travel in a direction indicated by arrow A in FIG. 5 and exit the housing 14 through the at least one opening 60.

Figure 6:
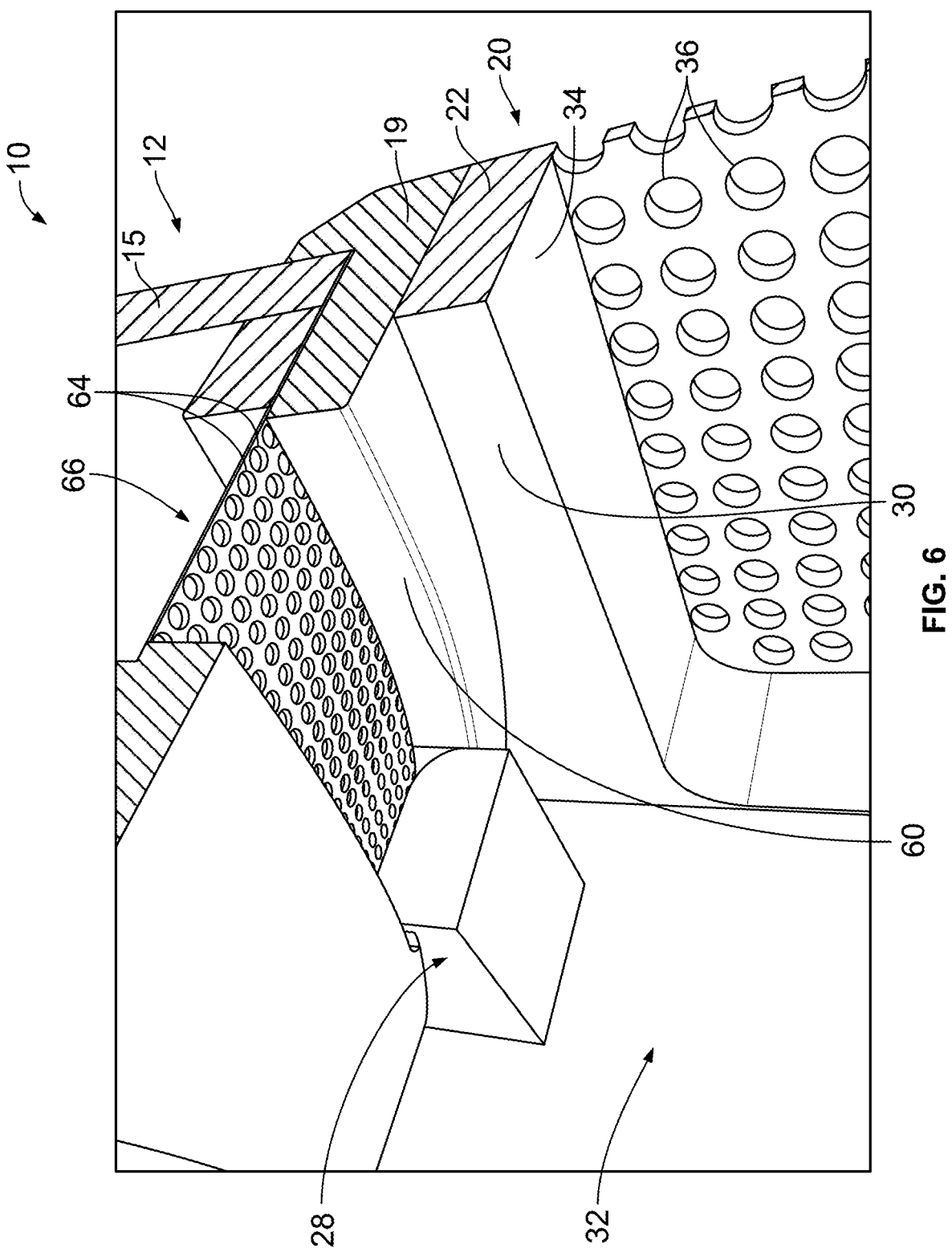

With continued reference to FIGS. 4-6, the speaker 50 is positioned within the housing 14 of the optical apparatus 12 such that a front chamber 62 is, or is defined between, the speaker 50, specifically the diaphragm 52, and the at least one opening 60. The housing 14 is located between speaker 50 and the body 22 of the resonator device 20. The optical apparatus 12 may comprise one or more seals 17-1, 17-2, 17-3 to acoustically seal the front chamber 62 and/or to protect the optical apparatus 12 from the environment. A seal 17-1, such as an O-ring or gasket, may be used to seal the speaker 50 and the inner component 17. Additional seals 17-2 and 17-3, such as an O-ring or gasket, may be present between the inner and outer components 17, 19, as shown in FIG. 4. Besides the at least one opening 60, the front chamber 62 may otherwise be acoustically sealed. Sealing of the front chamber 62, e.g., via seals 17-1 and 17-2, ensures that the acoustic waves generated by the speaker 50 exit only through the at least one opening 60 and prevents leakage of acoustic waves between the speaker 50 and the housing 14.

With reference to FIG. 5, in some examples, the at least one opening 60 may comprise a single opening with a height $H_{60}$, a length $L_{60}$, and a width $W_{60}$, in which the length $L_{60}$ is determined by a thickness of the housing 14, e.g., the inner and outer components 17, 19 of the first portion 14-1 of the housing 14, through which the at least one opening 60 is formed. A cross-sectional area of the opening 60 may be calculated by multiplying the height $H_{60}$ and width $W_{60}$. A volume of the opening 60 may be calculated by further multiplying by the length $L_{60}$.

With reference to FIGS. 5 and 6, in some examples, the at least one opening 60 may optionally comprise or be defined by a plurality of smaller openings 64. In the example shown, the plurality of openings 64 are formed in a grill 66, which may be a separate component that is coupled to the housing 14 and positioned over or received in the opening 60 (in FIG. 5, the grill 66 is shown in cross-section and a portion of a surface of the grill 66 is also visible). In the example shown in FIGS. 5 and 6, the grill 66 may be coupled between and/or secured to the inner and outer components 17, 19 of the first portion 14-1 of the housing 14 (e.g., via adhesive) and may be recessed with respect to an outer surface of the housing 14. The grill 66 may help to protect the speaker 50 from the environment and may reduce dust and debris entering the housing 14. In other examples (not shown), the grill 66 may be integral with the housing 14, e.g., the plurality of openings 64 may be formed directly in inner component 17 and/or outer component 19.

The plurality of openings 64 may define any suitable shape or combination of shapes and may be arranged in any suitable manner. In the example shown in FIGS. 5 and 6, the plurality of openings 64 comprise a generally circular shape and are arranged in a grid comprising a series of rows. Spacing between the openings 64 within each row and/or between the rows may be substantially uniform, but that need not be the case in all instances. In the example shown in FIG. 3B, the housing 114 of the optical apparatus 112 comprises a plurality of openings 164 that comprise elongated slots arranged in a starburst pattern. In further examples (not shown), the openings may define other shape(s), such as a hexagonal or honeycomb shape, etc., and may be arranged in other configurations, such as concentric circles with uniform or non-uniform spacing.

With reference to the detailed view in the inset of FIG. 5, the grill 66 may comprise an inner surface 66-1 and an outer surface 66-2, and the openings 64 may extend between the inner and outer surfaces 66-1, 66-2. The openings 64 comprise a diameter $D_{64}$ and a cross-sectional area (not labeled), in which the cross-sectional area for circular openings 64 is defined by a radius (not labeled) of the opening 64. Individual openings 64 may comprise a length $L_{64}$, in which the length $L_{64}$ is defined by a distance between the inner and outer surfaces 66-1, 66-2 of the grill 66, i.e., by a thickness of the grill 66. In some examples, the cross-sectional area of individual openings 64 may be substantially uniform along an entirety of the length $L_{64}$, as shown in FIG. 5. In other examples (not shown), the cross-sectional area may vary along at least a portion of the length $L_{64}$ of the opening 64.

With reference to the resonator device 20 shown in FIGS. 2, 4, and 6, the body 22 of the resonator device 20 comprises an aperture 30, a cavity 32, and at least one opening 34 (also referred to herein as at least one second opening). The aperture 30 is configured to receive acoustic waves generated by the speaker 50 in the optical apparatus 12. In particular, as shown in FIG. 4, the body 22 of the resonator device 20 is arranged so that the cavity 32 is positioned adjacent to the housing 14 of the optical apparatus 12, specifically adjacent to the opening 60 and the speaker 50, and the aperture 30 is configured to allow the acoustic waves generated by the speaker 50 to enter the cavity 32 of the resonator device 20 in a first direction 40, which is parallel to the direction indicated by arrow A in FIG. 5. The cavity 32 is configured to then redirect the acoustic waves, e.g., via reflection off internal walls of the resonator device 20, in a second direction 42 that is different from the first direction 40. The acoustic waves pass through the at least one opening 34 and exit the resonator device 20. The cavity 32 may optionally comprise a curved portion 32-1 positioned opposite the at least one opening 34. The curved portion 32-1 may be configured to, for example, reduce turbulence and distortion as the acoustic waves move through and exit the resonator device 20.

Figure 7:
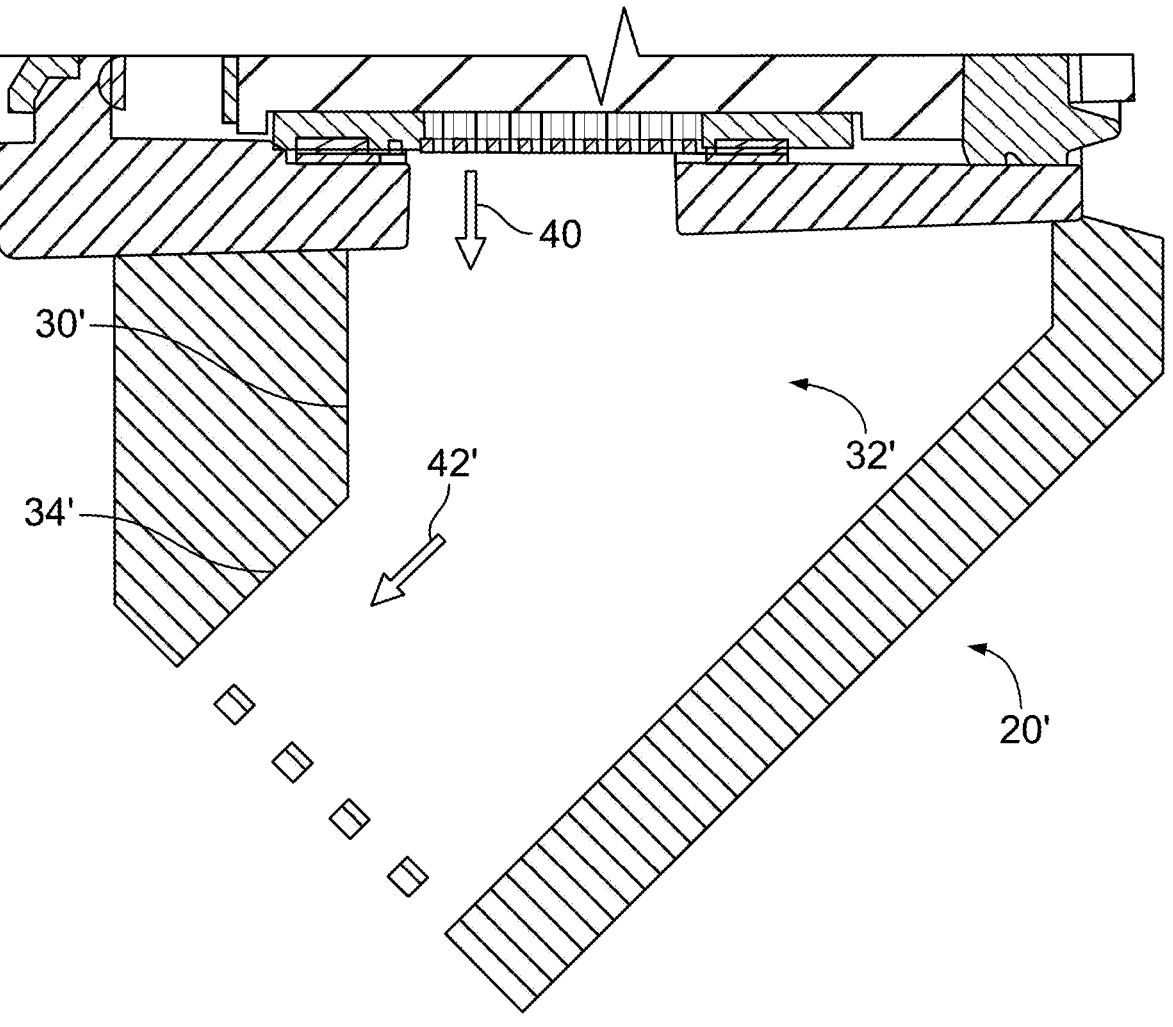
FIG. 7 is a cross-sectional view of an exemplary resonator device in accordance with the present disclosure.

The second direction 42 may be oriented at an angle between 1° to 90° and all ranges subsumed therein with respect to the first direction 40. In the example shown in FIG. 4, the second direction 42 is orthogonal or substantially perpendicular to the first direction 40. In another example shown in FIG. 7, a resonator device 20' may be configured so that the acoustic waves generated by the speaker (not visible) enter a cavity 32' of the resonator device 20' through an aperture 30' in the first direction 40 and are redirected in a second direction 42' that is oriented at an angle of 45° with respect to the first direction 40, where the acoustic waves exit the resonator device 20' via at least one opening 34'.

Redirection of the acoustic waves from the first direction 40 to the second direction 42, 42' changes the orientation of the acoustic waves with respect to, for example, a person positioned in front of the assembly 10. With reference to FIG. 2, the optical apparatus 12 may have a field of view oriented generally along the optical axis 18a, and the assembly 10 may be positioned so that a certain area is within this field of view. For example, the assembly 10 may be positioned so that a person walking toward or standing or sitting in front of the optical apparatus 12 is within the field of view. In the absence of the resonator device 20, acoustic waves exiting the optical apparatus 12 in the first direction 40 (in the absence of the resonator device 20) would generally continue to move downward and away from the person positioned in front of the assembly 10, which may cause a reduction in a perceived loudness of sound produced by the assembly 10. This decrease in the perceived loudness may be especially problematic in outdoor settings where ambient noise levels are higher and persons at a distance from the assembly 10 may have trouble hearing the alarm tone or other output of the assembly 10. When the resonator device 20 is installed, the acoustic waves are redirected in the second direction 42, 42', which may be substantially parallel to the optical axis 18a. The acoustic waves then exit the assembly 10 via the at least one opening 34, which is positioned at the front face 15 of the optical apparatus 12, and travel straight toward a person positioned in front of the assembly 10, thereby providing an increase in the perceived loudness of the sound produced by the assembly 10.

With reference to FIG. 4, in some examples, the at least one opening 34 may comprise a single slot with a height $H_{34}$, a length $L_{34}$, and a width (not shown; measured from a right edge to a left edge of the opening 34), in which the length $L_{34}$ is determined by a thickness of the body 22 of the resonator device 20 through which the at least one opening 34 is formed. A cross-sectional area of the opening 34 may be calculated by multiplying the height $H_{34}$ and width W. A volume of the opening 34 may be calculated by further multiplying by the length $L_{34}$. In the example shown, the opening 34 is substantially rectangular. In other examples (not shown), a portion of the opening 34 may be curved, e.g., to mirror a shape of the front face 15 and/or the outer component 19.

With continued reference to FIG. 4, in other examples, the at least one opening 34 may optionally further comprise a plurality of smaller openings 36 in addition to the slot 34. In the example shown, the plurality of openings 36 may be formed directly in the body 22 of the resonator device 20, such that the resonator device 20 is a one-piece integral component. In other examples (not shown), the plurality of openings 36 may be formed in a grill, which may be a separate component that is coupled to the body 22 of the resonator device 20 and positioned over or received in the slot or opening 34. The grill may help to protect the resonator device 20 and the speaker 50 from the environment and may reduce dust and debris entering the assembly 10.

With continued reference to FIG. 4, the plurality of openings 36 may comprise a generally circular shape or may define other shapes (not shown) such as elongated slots, a hexagonal or honeycomb shape, etc. In the example shown, the openings 36 are arranged in a grid comprising a series of rows. In other examples (not shown), the openings may be arranged in concentric circles. A spacing between the openings 36 within individual rows or concentric circles and/or between the rows or between the concentric circles may be substantially uniform. With reference to the detailed view in the inset of FIG. 4, the openings 36 may extend between inner and outer surfaces 38-1, 38-2 of the resonator device 20. The openings 36 comprise a diameter $D_{36}$ and a cross-sectional area (not labeled), in which the cross-sectional area for circular openings 36 is defined by a radius (not labeled) of the opening 36. Individual openings 36 may comprise a length $L_{36}$, in which the length $L_{36}$ is defined by a distance between the inner and outer surfaces 38-1, 38-2 of the resonator device 20, i.e., by a thickness of the resonator device 20. In some examples, the cross-sectional area of individual openings 36 may be uniform along an entirety of the length $L_{36}$, as shown in FIG. 4. In other examples (not shown), the cross-sectional area may vary along at least a portion of the length $L_{36}$ of the opening 36.

The resonator device 120 of FIGS. 3A-3C may be substantially similar to the resonator device 20 depicted in FIGS. 4 and 6. The resonator device 120 shown in FIGS. 3A-3C comprises an aperture 130, a cavity 132, and at least one opening 134. When the resonator device 120 is coupled to the optical apparatus 112, the aperture 130 is configured to receive acoustic waves from the optical apparatus 112 in a first direction and the cavity 32 is configured to redirect the acoustic waves, e.g., via reflection, in a second direction that is different from the first direction, as described above with respect to FIG. 4. The acoustic waves then exit the resonator device 120 via the at least one opening 134. The at least one opening 134 may comprise a single slot, which may be substantially similar to the opening 34 described above with respect to the resonator device 20 depicted in FIG. 4. As shown in FIGS. 3A and 3C, the at least one opening 134 may optionally comprise a respective plurality of openings 136, which may be substantially similar to the plurality of openings 36 described above with respect to the resonator device 20 depicted in FIG. 4 (the plurality of openings 136 are eliminated in FIG. 3B to illustrate the internal structure of the resonator device 120). The plurality of openings 136 may be formed directly in the body 122 of the resonator device 120 or in a separate grill (not shown), as described above with respect to FIG. 4.

The speaker 50 may be a security alarm speaker. As noted above, the speaker 50 may be used in the optical apparatus 12 shown in FIGS. 1, 2 and 4-6. The speaker 50 may also be used in the video doorbell 110 shown in FIGS. 3A-3C. The electronic audio signal may comprise an alarm signal when the electronic audio signal has a value or magnitude causing the speaker 50 to generate an output (i.e., acoustic waves) comprising an alarm tone. In other examples, alternatively or in addition, the electronic audio signal may comprise an electronic speech signal when it has a value or magnitude causing the speaker 50 to generate an output (i.e., acoustic waves) comprising, or otherwise in the form of, audible speech. The electronic speech signal may correspond to human speech (live or recorded) or speech synthesized by a computer system. In one particular example, the electronic audio signal may comprise an electronic alarm signal and/or an electronic speech signal such that the output generated by the speaker 50 comprises an alarm tone and/or speech. Human speech typically has a frequency that falls within a range from 400 Hz to 4.0 kHz. Alarm tones typically have a frequency that fall with a range from 2.0 kHz to 4.0 kHz.

The assembly 10, 110 in accordance with the present disclosure provides an increased output within a frequency range of the alarm tone via creation of a Helmholtz resonator. Conventional devices often seek to avoid the effects produced by a Helmholtz resonator, which can cause one or more peaks in the output of the device, i.e., acoustic waves generated by the speaker, at certain frequencies and a reduction in output at frequencies higher than the Helmholtz resonance frequency. These peaks are typically undesirable, and conventional speaker devices are typically designed to make a resonance frequency of the device as high as possible so that the resonance frequency is outside of the frequency bandwidth of the speaker output. In addition, the output of the device may be affected by speaker orientation. When the speaker is oriented toward a listener, the sound output of the device is generally perceived as being louder, as opposed to when the speaker is oriented at an angle with respect to the listener.

In accordance with one aspect of the present disclosure, the resonator device 20, 120 is coupled with the optical apparatus 12, 112 and the resonator device 20, 120 is configured such that the assembly 10, 110 comprises a Helmholtz resonator with a resonance frequency or frequency range that is tuned to match the frequency or frequency range of the output of the speaker 50, when the speaker 50 is generating the alarm tone, thereby increasing an output (e.g., a sound pressure output level) of the assembly 10, 110 when the speaker 50 is generating the alarm tone, as compared to a conventional optical apparatus without a resonator device. By doing so, a sound pressure output level of the assembly 10, 110 can be increased within a certain resonance frequency or frequency range without further costs that derive from changing components of the assembly 10, 110, such as speaker size, speaker orientation, battery life, etc. In addition, the resonator devices 20, 120 in accordance with the present disclosure are configured to redirect sound produced by the speaker 50 to ensure that the output of the assembly 10, 110 is perceived as being as loud as possible.

With reference to FIGS. 4 and 5, when the diaphragm 52 of the speaker 50 vibrates, acoustic waves are generated in the front chamber 62 of the optical apparatus 12 and vent or otherwise escape through the opening(s) 60, 64. The acoustic waves then enter the cavity 32 of the resonator device 20 and vent or otherwise escape through the opening(s) 34, 36. The aperture 30, the cavity 32, and the opening(s) 34, 36 of the resonator device 20 are sized to collectively generate an increased output of the assembly 10 within a frequency range of the alarm tone. A combination of the apparatus (e.g., the optical apparatus 12) and the resonator device 20, i.e., the assembly 10, defines a resonator 70 having a resonance frequency that is within the frequency range of the alarm tone. In particular, the front chamber 62 of the optical apparatus 12 is in communication with, e.g., coupled or acoustically coupled to, the cavity 32 of the resonator device 20, such that the opening(s) 60, 64 of the optical apparatus 12, along with the aperture 30 and the opening(s) 34, 36 of the resonator device 20 are configured to collectively generate, with the front chamber 62 and cavity 32, a peak output of the assembly 10 within the frequency range of the alarm tone. As described herein, the optical apparatus 12 may comprise a plurality of openings 64, the resonator device 20 may comprise a plurality of openings 36, or both the optical apparatus 12 and the resonator device 20 may comprise a plurality of respective openings 64, 36.

The speaker 50 may be a microspeaker, e.g., an electrodynamic speaker, that is capable of generating an output within a frequency range of 400 Hz to 4.0 kHz. The frequency range of the alarm tone may fall within a range from 2.0 kHz and 4.0 kHz, and in one particular example, the frequency range of the alarm tone may be from 2.5 kHz to 2.7 kHz.

With reference to FIG. 4, when the optical apparatus 12 is not coupled to the resonator device 20, the front chamber 62 and the opening(s) 60, 64 collectively define a resonator 72 (also referred to herein as a first resonator) having a resonance frequency that may be different from the resonance frequency of the resonator 70 (also referred to herein as a second resonator) of the assembly 10. In some examples, the resonance frequency of the resonator 72 defined by the optical apparatus 12 without the resonator device 20 may be outside the frequency range of the alarm tone. One or more parameters of the resonator device 20 may be defined, e.g., by altering the body 22 (including altering one or more dimensions of the aperture 30, the cavity 32, and/or the opening(s) 34, 36 as described herein), to raise or lower the resonance frequency of the resonator 70 of the assembly 10, such that the resonance frequency of the resonator 70 falls within the frequency range of the output of the speaker 50 corresponding to the alarm tone.

The resonator device 20 may be configured to increase the sound pressure level of a peak output of the assembly 10 when generating an alarm tone by at least 6 decibels (dB), and preferably by 10 dB or more. Sound pressure output is typically measured in units of dBSPL (decibels relative to 20 µPa). As described herein with respect to FIGS. 4 and 7, this increase in sound pressure output level may be further augmented by redirecting the acoustic waves generated by the speaker 50 from the first direction 40 to the second direction 42, 42', e.g., by reflection, thereby increasing the perceived loudness of the sound generated by the assembly 10. In the example shown in FIGS. 2 and 4, the second direction 42 may be substantially parallel to the optical axis 18a of the optical apparatus 12. It may be preferred that the output of the assembly 10 is at least 65 dB at a distance of 30 feet from the assembly 10 for both the alarm tone and speech. The assembly 110 depicted in FIGS. 3A-3C functions under the same principles.

In general, designing the resonance frequency or frequency range of a Helmholtz resonator to match a specific frequency or frequency range, e.g., the frequency or frequency range of the alarm tone, may be achieved by designing, configuring, or adjusting one or more parameters of the resonator. With reference to FIGS. 4 and 5, in some examples, these parameters may include the volume of one or both of the front chamber 62 and the cavity 32 and one or more parameters of the aperture 30 and opening(s) 60, 64, 34, and/or 36, such as the cross-sectional area of the aperture 30 and opening(s) 60, 64, 34, and/or 36; the length $L_{60}$, $L_{64}$, $L_{34}$, $L_{36}$ of the opening(s) 60, 64, 34, and/or 36 and a length of the aperture 30; a total number of opening(s) 60, 64, 34, and/or 36; and a percent open area for the plurality of openings 64 and/or 36 (calculated by multiplying the number of openings 64, 36 by a cross-sectional area of the openings 64, 36 and dividing by a cross-sectional area of the opening 60, 34). Hence, the aperture 30 and the opening(s) 60, 64, 34, and/or 36, the front chamber 62 and the cavity 32 may be sized to generate the peak output of the assembly 10 when the speaker 50 is generating an alarm tone. In particular, the housing 14 and body 22 of the optical apparatus and the resonator device 20, respectively, (e.g., the front chamber 62 and/or cavity 32 and the aperture 30 and opening(s) 60, 64, 34, and/or 36) may be dimensioned to create a Helmholtz resonator having a resonance frequency or a resonance frequency range that falls within or matches at least a portion of the frequency range of the output of the speaker 50 when generating an alarm tone, such that the resonator 70 is able to selectively increase a sound pressure level of the acoustic waves output by the assembly 10 within this frequency or frequency range of the output of the speaker 50 corresponding to the alarm tone.

In a further aspect, when the optical apparatus 12, 112 is an existing product and redesign of the optical apparatus 12, 112 is to be avoided, such as for cost reasons, one or more parameters of the resonator device 20 may be designed, e.g., by selecting the body 22 (including selecting one or more dimensions of the aperture 30, the cavity 32, and/or the opening(s) 34, 36 as described herein), to raise or lower the resonance frequency of the resonator 70 of the assembly 10, such that the resonance frequency of the resonator 70 falls within the frequency range of the output of the speaker 50 corresponding to the alarm tone.

When designing a Helmholtz resonator with a desired resonance frequency, an assembly comprising the optical apparatus and the resonator device may be built and a frequency response may be measured to determine if the resonance frequency of the assembly is equal to or near the desired resonance frequency. If not, one or more parameters of the assembly, e.g., the resonator device, may be adjusted/varied until those parameters result in an assembly having the desired resonance frequency, particularly when the speaker generates an alarm tone.

FIGS. 8A-8F provide graphs simulating the effect of various parameters on a peak output sound pressure level of an assembly and a frequency at which the peak output sound pressure level is observed. An assembly in accordance with the structure shown in FIGS. 1, 2, and 4-6 is used as a baseline (indicated as "Nominal") for FIGS. 8A-8F. The device is simulated to be driven by a sine wave with 1 Watt RMS and output sound pressure measured at a distance of 1 meter from the device. Output sound pressure is typically measured in units of dBSPL (decibels relative to 20 µPa).

Figure 8A:
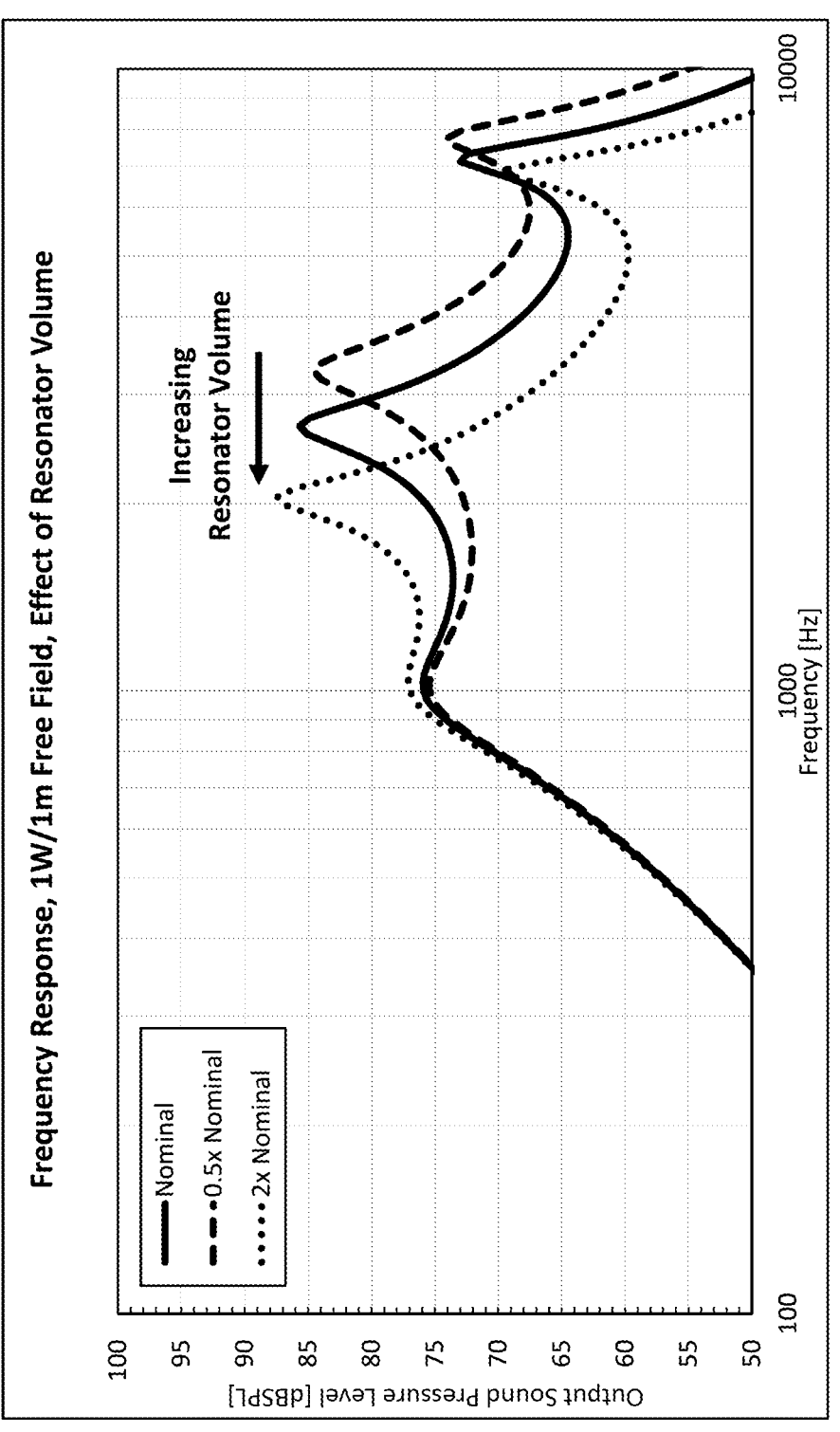
FIGS. 8A-8F are graphs illustrating the effect of various parameters on a sound pressure output level of an assembly in accordance with the present disclosure.

FIGS. 8A-8F are graphs illustrating the effect of various parameters on a peak output sound pressure level of the resonator device 20 and a frequency at which the peak output sound pressure level of the assembly 10 is observed. FIG. 8A illustrates the effects of changing a volume of the resonator cavity 32, while holding all other device parameters constant. As compared to a nominal or baseline level ("Nominal"), increasing the cavity volume ("2× Nominal")

decreases the frequency at which the peak output sound pressure level is observed, and decreasing the cavity volume ("0.5× Nominal") increases the frequency at which the peak output sound pressure level is observed. Increasing the cavity volume also increases the peak output sound pressure level, while decreasing the cavity volume decreases the peak output sound pressure level.

Figure 8B:
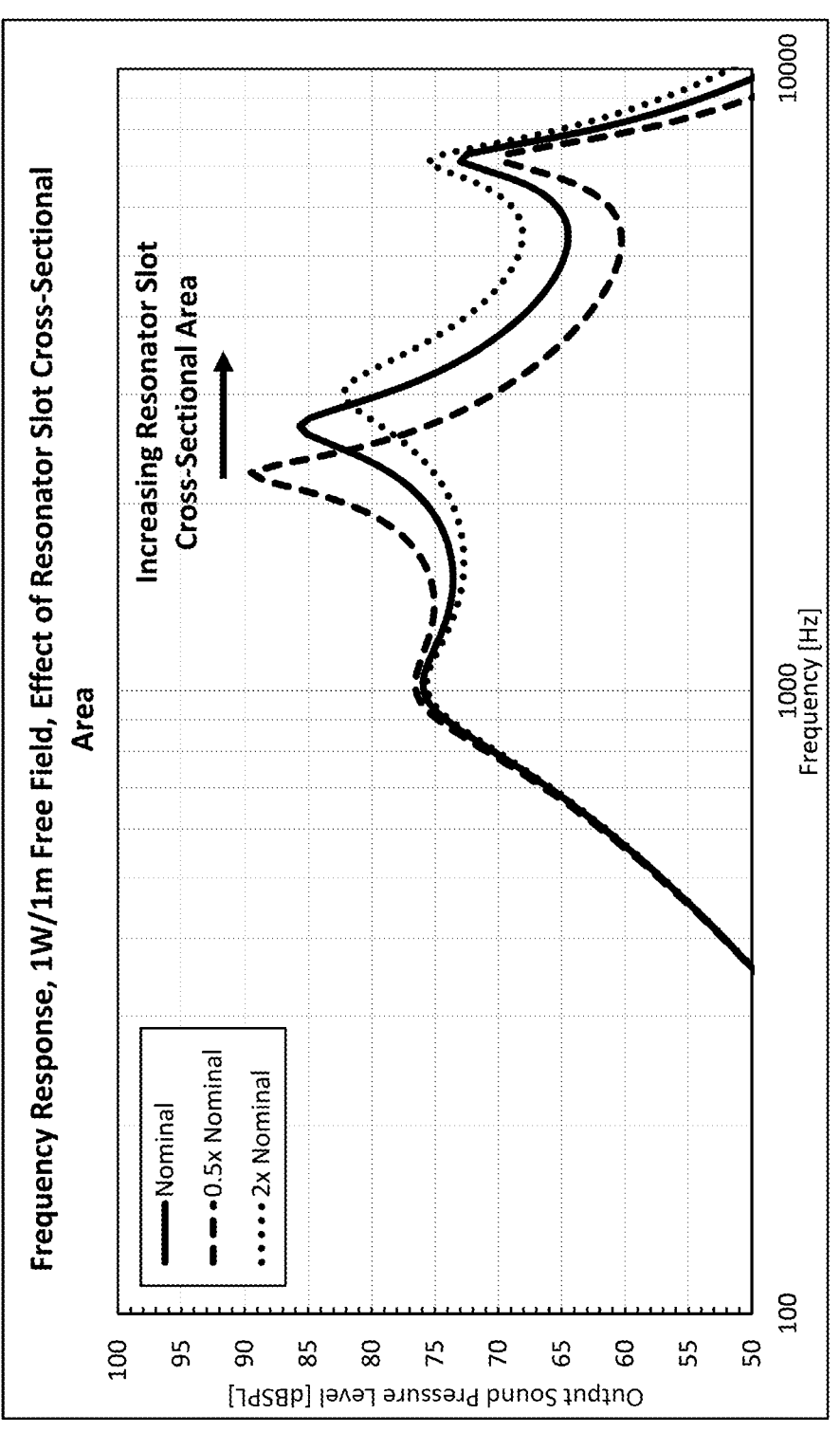

FIG. 8B illustrates the effects of changing a cross-sectional area, e.g., a height $H_{34}$ and/or width, of the opening (slot) 34, while holding all other device parameters constant. As compared to a nominal or baseline level, increasing the cross-sectional area of the slot (2×) increases the frequency at which the peak output sound pressure level is observed, and decreasing the cross-sectional area of the slot (0.5×) decreases the frequency at which the peak output sound pressure level is observed. Increasing the cross-sectional area of the slot also decreases the peak output sound pressure level, while decreasing the cross-sectional area of the slot slightly increases the peak output sound pressure level.

Figure 8C:
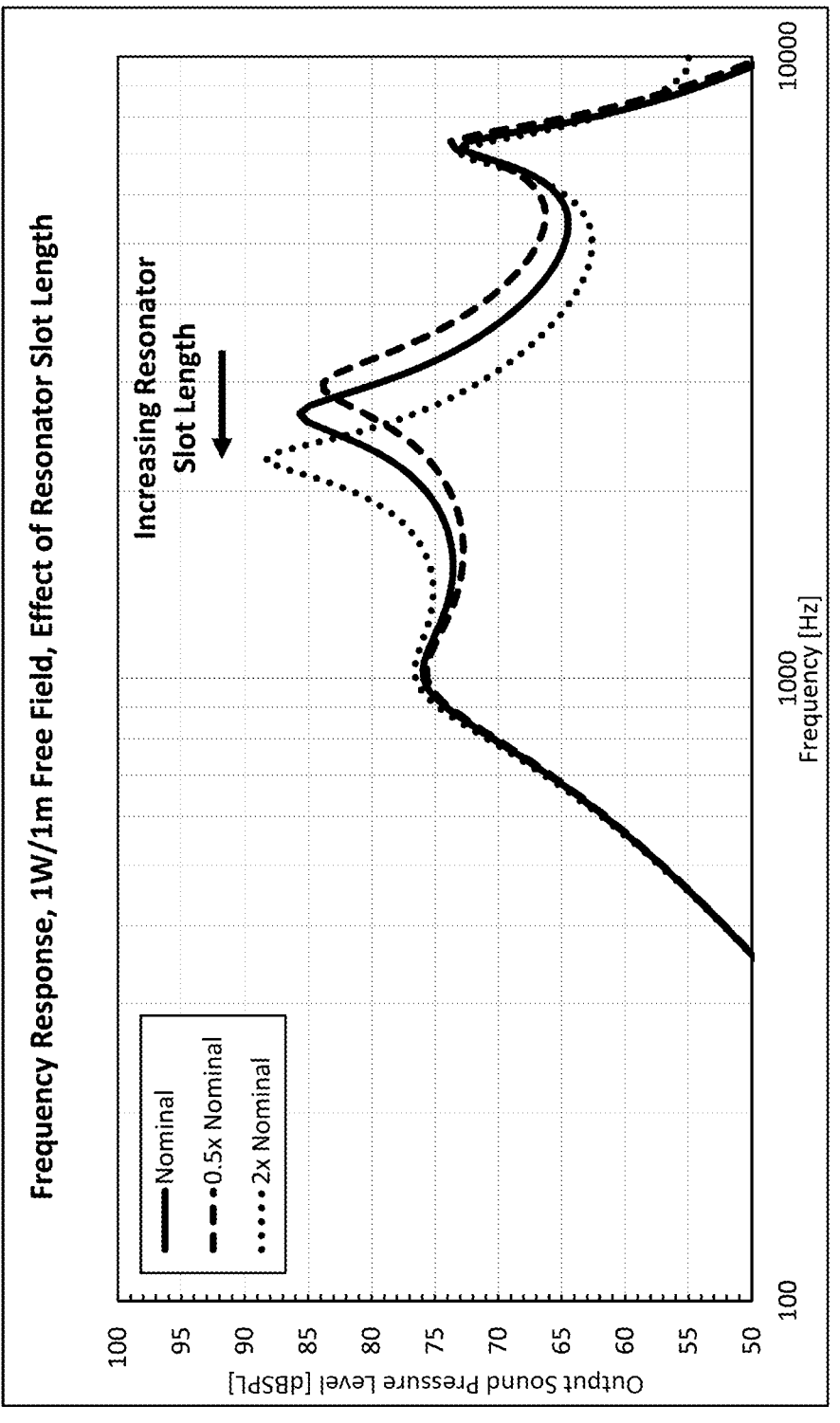

FIG. 8C illustrates the effects of changing a length $L_{34}$ of the opening (slot) 34, while holding all other device parameters constant. As compared to a nominal or baseline level, increasing the slot length (2×) decreases the frequency at which the peak output sound pressure level is observed, and decreasing the slot length (0.5×) increases the frequency at which the peak output sound pressure level is observed. Increasing the slot length also increases the peak output sound pressure level, while decreasing the slot length decreases the peak output sound pressure level.

Figure 8D:
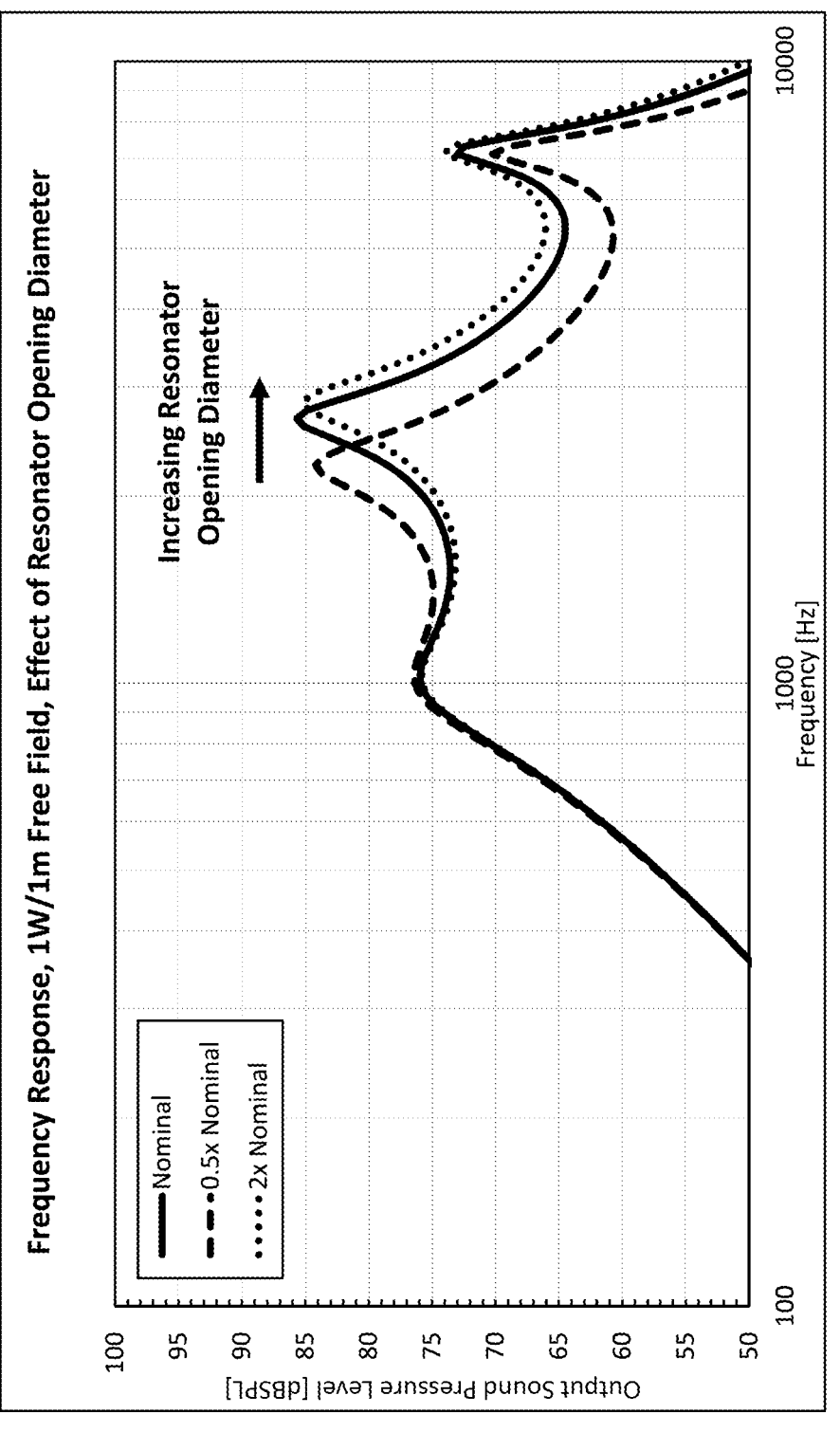

FIG. 8D illustrates the effects of changing a diameter $D_{36}$ of the plurality of openings 36, while holding all other device parameters constant. As compared to a nominal or baseline level, increasing the opening diameter (2×) slightly increases the frequency at which the peak output sound pressure level is observed, and decreasing the opening diameter (0.5×) decreases the frequency at which the peak output sound pressure level is observed. Increasing and decreasing the opening diameter both slightly decrease the peak output sound pressure level.

Figure 8E:
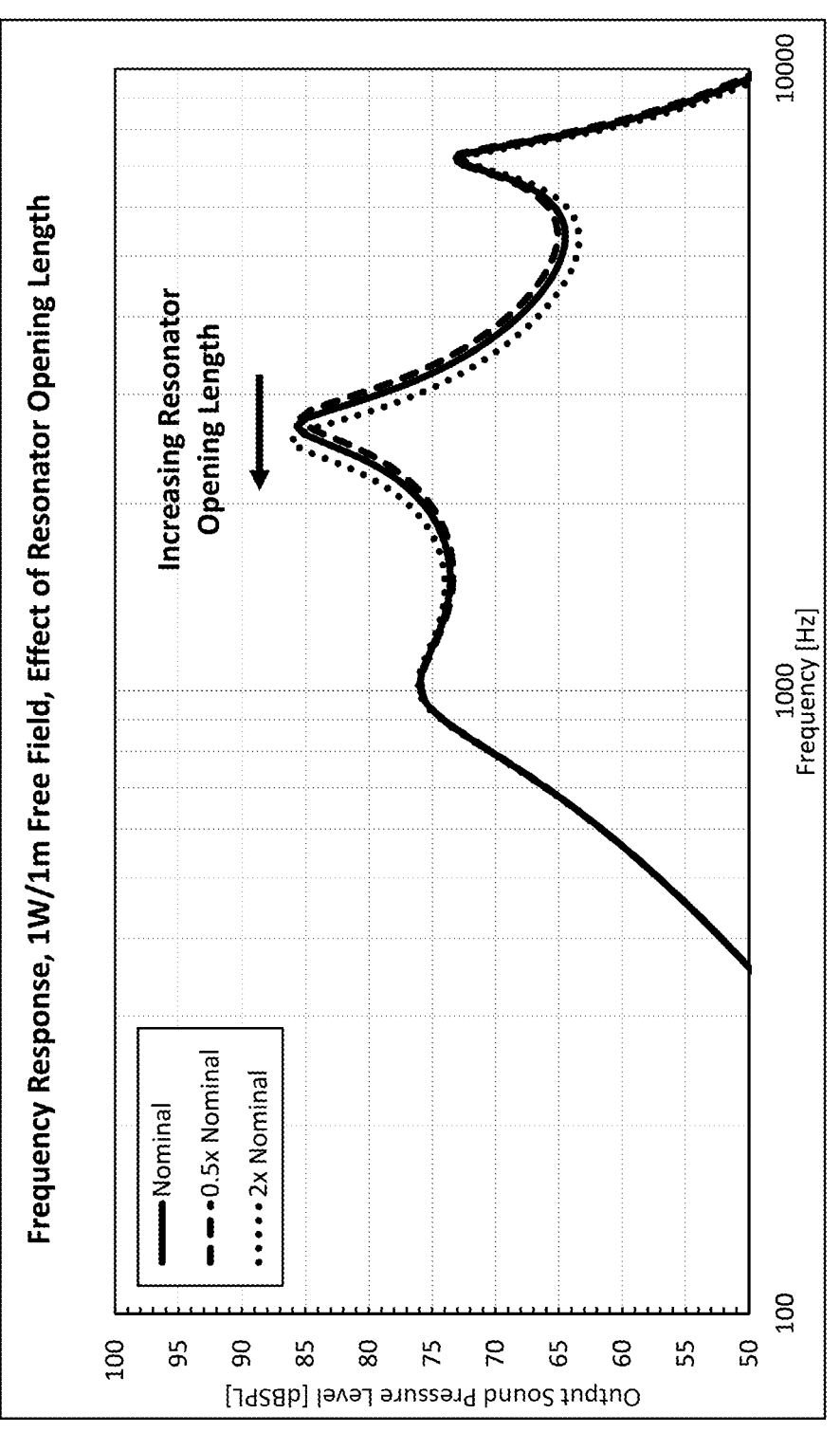

FIG. 8E illustrates the effects of changing a length $L_{36}$ of the plurality of openings 36, while holding all other device parameters constant. As compared to a nominal or baseline level, increasing the opening length (2×) slightly decreases the frequency at which the peak output sound pressure level is observed, and decreasing the opening length (0.5×) slightly increases the frequency at which the peak output sound pressure level is observed. Increasing the opening length also slightly increases the peak output sound pressure level, while decreasing the opening length very slightly decreases the peak output sound pressure level.

Figure 8F:
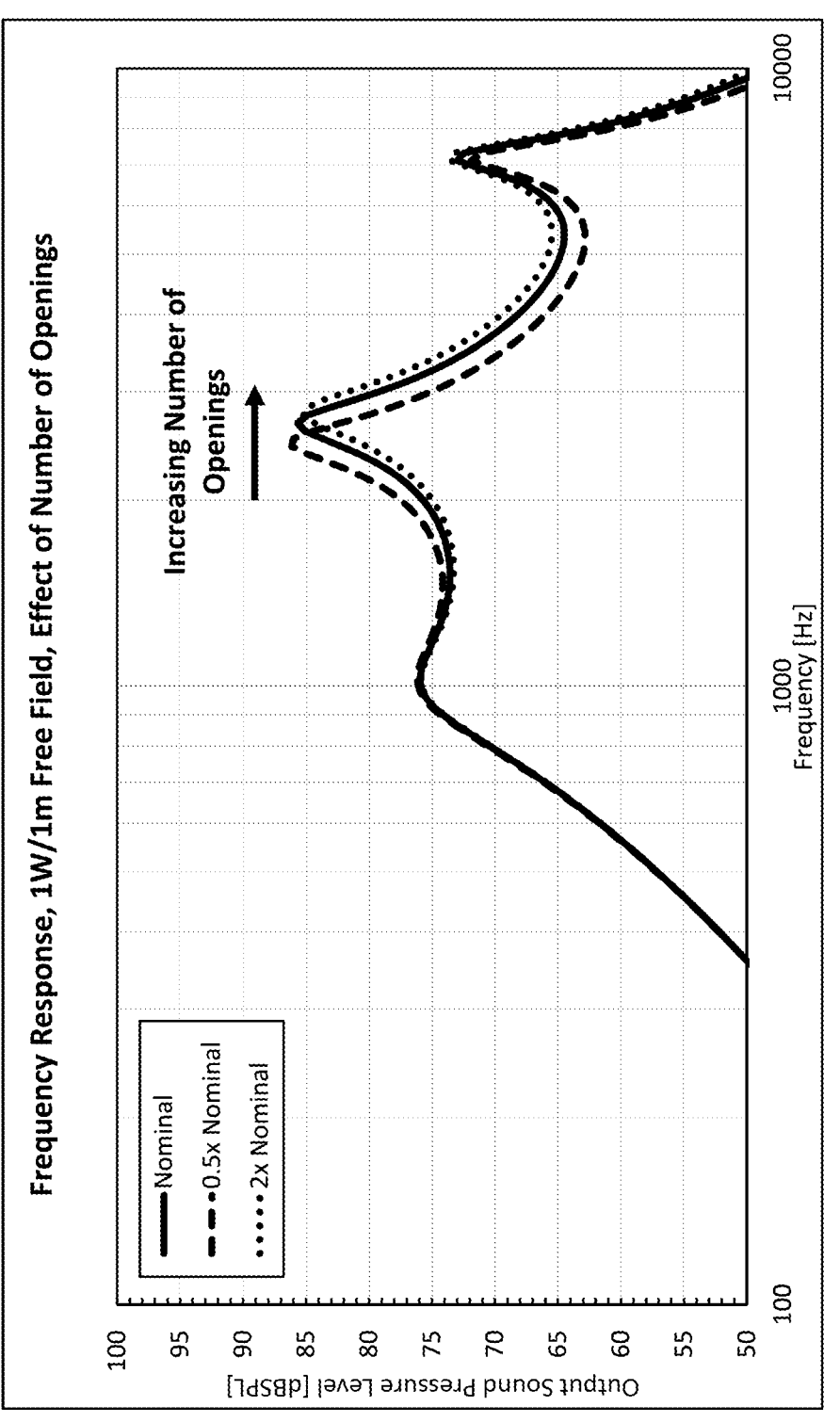

FIG. 8F illustrates the effects of changing a number of the plurality of openings 36, while holding all other device parameters constant. As compared to a nominal or baseline level, increasing the number of openings (2×) slightly increases the frequency at which the peak output sound pressure level is observed, and decreasing the number of openings (0.5×) slightly decreases the frequency at which the peak output sound pressure level is observed. Increasing the number of openings very slightly decreases the peak output sound pressure level, while decreasing the number of openings slightly increases the peak output sound pressure level.

As noted above, one or more parameters of the assembly may be adjusted until those parameters result in an assembly having the desired resonance frequency. For example, as shown in FIGS. 8A-8F, when a resonance frequency of the assembly is higher than the desired resonance frequency (i.e., the frequency at which the peak output sound pressure level is observed is higher than desired), the cavity volume can be increased, the cross-sectional area of the slot 34 (e.g., the slot height and/or width) can be decreased, the slot length can be increased, the diameter of the openings can be decreased, the length of the openings can be increased, and/or the number of openings can be decreased. When the resonance frequency of the assembly is lower than the desired resonance frequency (i.e., the frequency at which the peak output sound pressure level is observed is lower than desired), the cavity volume can be decreased, the cross-sectional area of the slot can be increased, the slot length can be decreased, the diameter of the openings can be increased, the length of the openings can be decreased, and/or the number of openings can be increased. In this manner, the final values of the one or more parameters may be selected such that a peak output sound pressure level of the assembly is equal to the desired frequency or within the desired frequency range, specifically a frequency or frequency range corresponding to an alarm tone.

Figure 9:
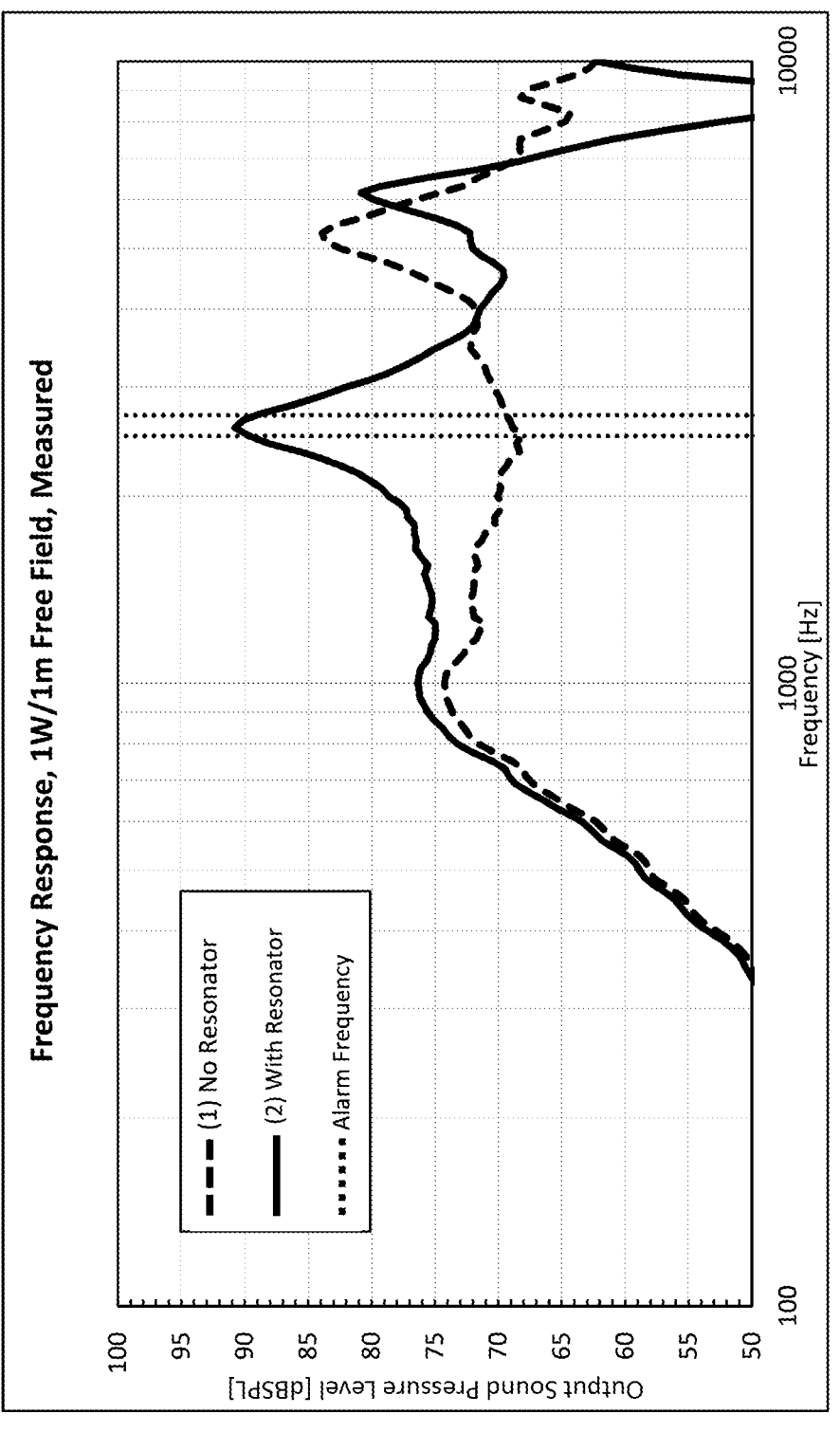
FIG. 9 is a graph illustrating a sound pressure output level of an assembly comprising an optical apparatus and a resonator device in accordance with the present disclosure, as compared to two conventional optical apparatuses.

FIG. 9 provides a simulation of a sound pressure output level of an assembly comprising an optical apparatus and a resonator device in accordance with the present disclosure, as compared to the optical apparatus alone. The dashed line ("(1) No Resonator") corresponds to the optical apparatus 12 in FIG. 4 alone, without the resonator device 20 but with the grill 66 installed over the opening 60 (referred to as Device (1)). The solid line ("(2) With Resonator") corresponds to the assembly 10 shown in FIG. 4, which includes the optical apparatus 12, the grill 66, the resonator device 20, and the plurality of openings 36 (referred to as Device (2)). A desired frequency range of 2.5 kHz to 2.7 kHz, i.e., the frequency range of an alarm tone, is indicated with vertical dotted lines in FIG. 9.

It can be seen in FIG. 9 that Device (1) produces a peak sound pressure output level (83.9 dBSPL) at 5.3 kHz, which falls outside the desired frequency range of 2.5 kHz to 2.7 kHz. Adding the resonator device in Device (2) demonstrates a significantly higher peak sound pressure output level (90.8 dBSPL) that falls within the desired frequency range of 2.5 kHz to 2.7 kHz.

Examples

In the following example, a resonator device, e.g., a resonator device 20 as shown in FIG. 4, is constructed, in which the parameters of the device are as follows (with reference to the corresponding structures and reference numerals of FIG. 4):

Volume of cavity 32=4.54 cm$^3$
Height $H_{34}$ of opening 34=6.2 mm
Width of opening 34=32.2 mm
Length $L_{34}$ of opening 34=4.5 mm
Cross-sectional area of opening 34=197 mm$^2$
Volume of opening 34=0.89 cm$^3$
Open area defined by the plurality of openings 36=68.2 mm$^2$
Percent open area=34.6%
Number of openings 36=101
Diameter $D_{36}$ of each opening 36=1.00 mm
Length $L_{36}$ of each opening 36=0.50 mm
Cross-sectional area of each opening 36=0.785
Spacing between rows of openings=1.50 mm
Spacing between openings within each row=1.50 mm
The resonator device 20 is coupled to an optical apparatus 12 (SimpliSafe Model No. SSOBCM4) and included a speaker 50 (Ole Wolff, P/N OWS-131845CW-4-BOX).

Figure 10:
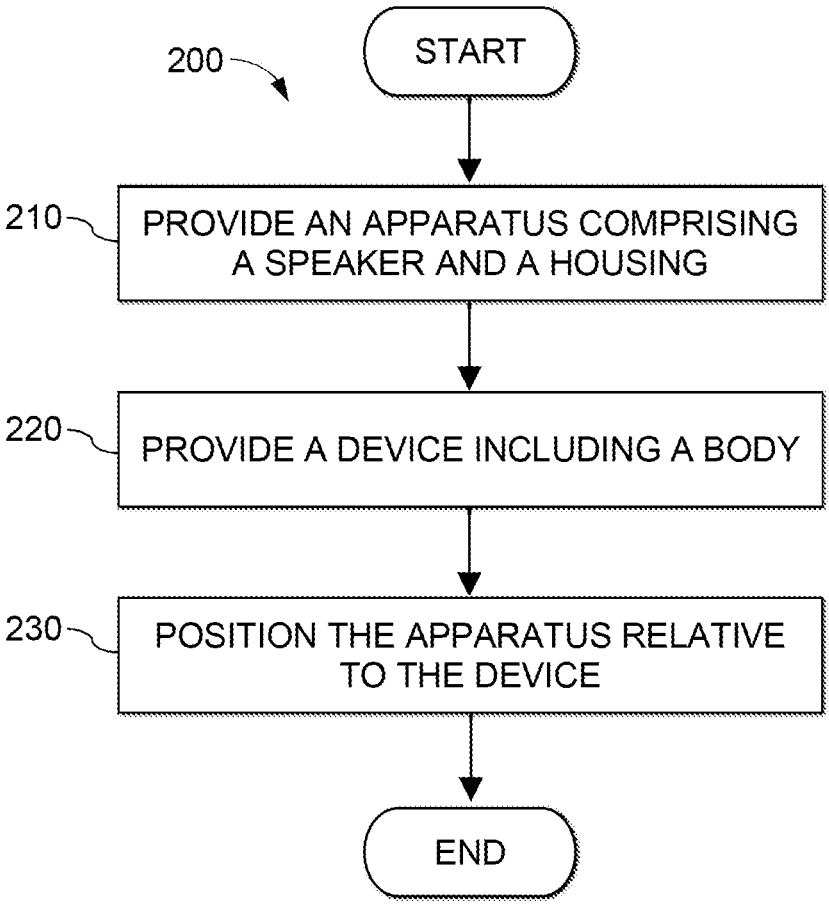
FIG. 10 is a flowchart illustrating a method in accordance with the present disclosure.

FIG. 10 is a flowchart illustrating a method 200 in accordance with the present disclosure. The method 200 comprises providing an apparatus comprising a speaker and a housing at 210, in which the speaker may be configured to generate acoustic waves defining an alarm tone and the housing may enclose the speaker and include at least one first opening. The at least one first opening may be located within the housing such that a front chamber is defined between the speaker and the at least one first opening, in which the acoustic waves exit from the apparatus through the at least one first opening. The method 200 may continue with providing a device including a body at 220, in which the body may have an aperture, a cavity, and at least one second opening. At 220, the apparatus is positioned relative to the device to enable the cavity to receive through the aperture the acoustic waves generated by the speaker and allow the acoustic waves to exit from the device through the at least one second opening, so that the aperture, the cavity and the at least one second opening collectively create, with the front chamber and the at least one first opening, a resonator that generates an increased output of the assembly within a frequency range of an output of the speaker corresponding to the alarm tone. The method 200 may then conclude.

In some examples, the front chamber and the at least one first opening may collectively define a first resonator when the apparatus is used without the device, in which the resonator defined by the front chamber, the at least one first opening, the aperture, the cavity, and the at least one second opening comprises a second resonator and the method 200 may optionally further comprise: prior to positioning the apparatus relative to the device, determining a resonance frequency of the first resonator, in which the resonance frequency of the first resonator is different from the resonance frequency of the second resonator and does not fall within the frequency range of the output of the speaker corresponding to the alarm tone; and based on the resonance frequency of the first resonator, altering the body to raise or lower the resonance frequency of the second resonator, such that the resonance frequency of the second resonator falls within the frequency range of the output of the speaker corresponding to the alarm tone.

In other examples, the method 200 may optionally further comprise defining one or more parameters of the device such that the aperture, the cavity, and the at least one second opening may collectively create, with the front chamber and the at least one first opening, the resonator that generates the increased output of the assembly within the frequency range of the output of the speaker corresponding to the alarm tone. In one aspect, the at least one second opening may comprise a slot and a plurality of openings, in which the one or more parameters may comprise at least one of a volume of the cavity, a length of the slot, or a length of the plurality of the openings and the method 200 may optionally further comprise: when the resonance frequency is to be decreased, increasing at least one of the volume of the cavity, the length of the slot, or the length of the plurality of the openings; and when the resonance frequency is to be increased, decreasing at least one of the volume of the cavity, the length of the slot, or the length of the plurality of the openings. In another aspect, the one or more parameters may comprise at least one of a cross-sectional area of the slot, a diameter of the plurality of openings, or a number of the plurality of openings and the method 200 may optionally further comprise: when the resonance frequency is to be decreased, decreasing at least one of the cross-sectional area of the slot, the diameter of the plurality of openings, or the number of the plurality of openings; and when the resonance frequency is to be increased, increasing at least one of the cross-sectional area of the slot, the diameter of the plurality of openings, or the number of the plurality of openings.

Figure 11:
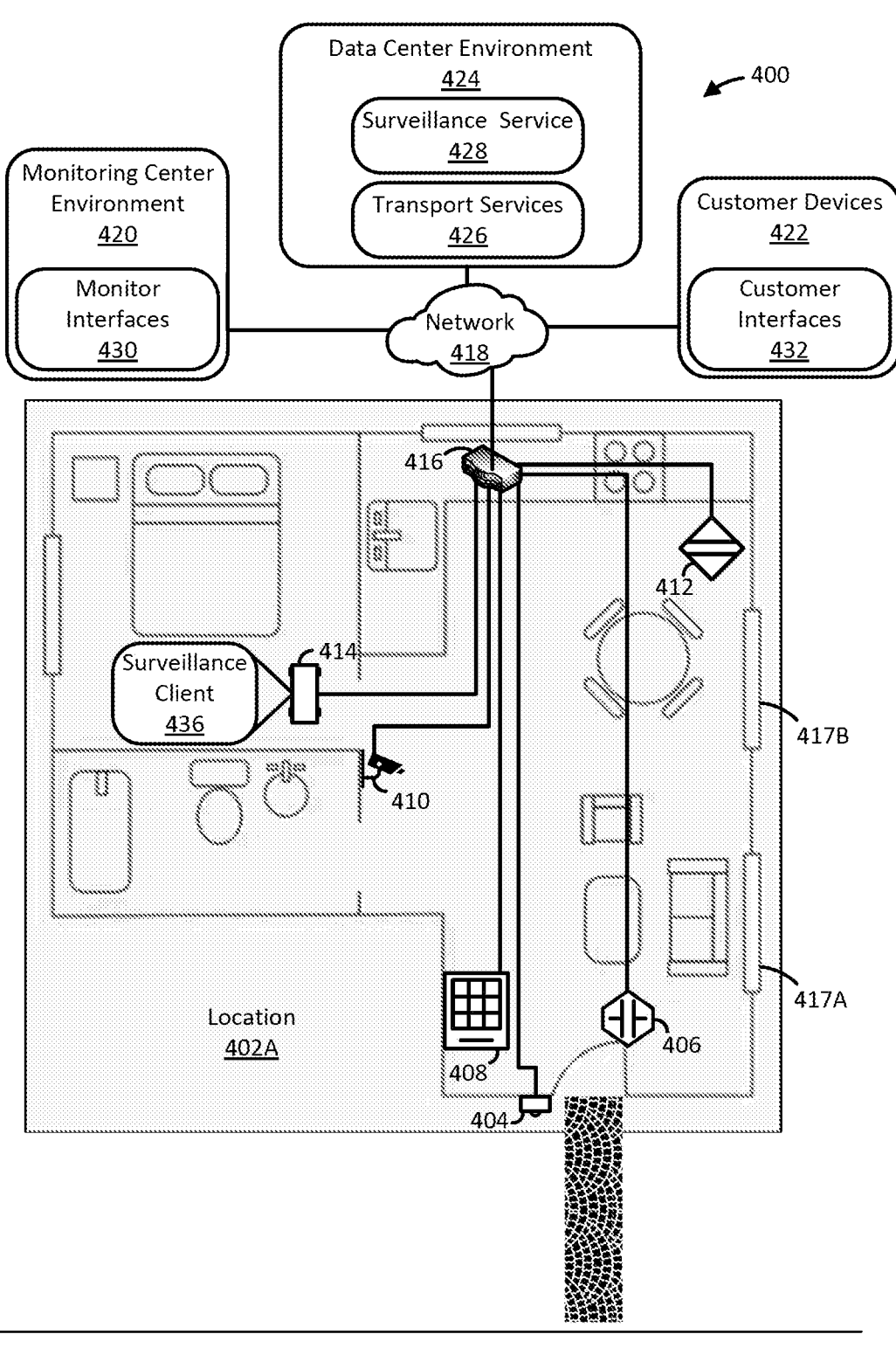
FIG. 11 is a schematic diagram of a security system, according to some examples described herein.

In some examples, a device or assembly in accordance with the present disclosure may be part of a security system. FIG. 11 is a schematic diagram of a security system 400 configured to establish and utilize zones in accordance with some examples. As shown in FIG. 11, the system 400 includes a monitored location 402A, a monitoring center environment 420, a data center environment 424, one or more customer devices 422, and a communication network 418. Each of the monitored location 402A, the monitoring center 420, the data center 424, the one or more customer devices 422, and the communication network 418 include one or more computing devices (e.g., as described below with reference to FIG. 15). The one or more customer devices 422 are configured to host one or more customer interface applications 432. The monitoring center environment 420 is configured to host one or more monitor interface applications 430. The data center environment 424 is configured to host a surveillance service 428 and one or more transport services 426. The location 402A includes image capture devices 404 and 410 (e.g., a device or assembly 10, 110 comprising a doorbell and a camera, respectively in accordance with the present disclosure), a contact sensor assembly 406, a keypad 408, a motion sensor assembly 412, a base station 414, and a router 416. The base station 414 hosts a surveillance client 436.

In some examples, the router 416 is a wireless router that is configured to communicate with the devices disposed in the location 402A (e.g., devices 404, 406, 408, 410, 412, and 414) via communications that comport with a communications standard such as any of the various Institute of Electrical and Electronics Engineers (IEEE) 108.11 standards. As illustrated in FIG. 11, the router 416 is also configured to communicate with the network 418. It should be noted that the router 416 implements a local area network (LAN) within and proximate to the location 402A by way of example only. Other networking technology that involves other computing devices is suitable for use within the location 402A. For instance, in some examples, the base station 414 can receive and forward communication packets transmitted by the image capture device 410 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 11, the network 418 can include one or more public and/or private networks that support, for example, internet protocol (IP). The network 418 may include, for example, one or more LANs, one or more PANs, and/or one or more wide area networks (WANs). The LANs can include wired or wireless networks that support various LAN standards, such as a version of IEEE 108.11 and the like. The PANs can include wired or wireless networks that support various PAN standards, such as BLUETOOTH, ZIGBEE, and the like. The WANs can include wired or wireless networks that support various WAN standards, such as Code Division Multiple Access (CDMA), Global System for Mobiles (GSM), and the like. The network 418 connects and enables data communication between the computing devices within the location 402A, the monitoring center environment 420, the data center environment 424, and the customer devices 422. In at least some examples, both the monitoring center environment 420 and the data center environment 424 include network equipment (e.g., similar to the router 416) that is configured to communicate with the network 418 and computing devices collocated with or near the network equipment.

Continuing with the example of FIG. 11, the data center environment 424 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 424 can be dedicated to the security system 400, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 11, the data center environment 424 is configured to host the surveillance service 428 and the transport services 426.

Continuing with the example of FIG. 11, the monitoring center environment 420 can include a plurality of computing devices (e.g., desktop computers) and network equipment (e.g., one or more routers) connected to the computing devices and the network 418. The customer devices 422 can include personal computing devices (e.g., a desktop computer, laptop, tablet, smartphone, or the like) and network equipment (e.g., a router, cellular modem, cellular radio, or the like). As illustrated in FIG. 11, the monitoring center environment 420 is configured to host the monitor interfaces 430 and the customer devices 422 are configured to host the customer interfaces 432.

Continuing with the example of FIG. 11, the devices 404, 406, 410, and 412 are configured to acquire analog signals via sensors incorporated into the devices, generate digital sensor data based on the acquired signals, and communicate (e.g., via a wireless link with the router 416) the sensor data to the base station 414. The type of sensor data generated and communicated by these devices varies along with the type of sensors included in the devices. For instance, the image capture devices 404 and 410 can acquire ambient light, generate frames of image data based on the acquired light, and communicate the frames to the base station 414, although the pixel resolution and frame rate may vary depending on the capabilities of the devices. In some examples, the image capture devices 404 and 410 can also receive and store filter zone configuration data and filter the frames using one or more filter zones prior to communicating the frames to the base station 414. As shown in FIG. 11, the image capture device 404 has an FOV that originates proximal to a front door of the location 402A and can acquire images of a walkway, highway, and a space between the location 402A and the highway. The image capture device 410 has an FOV that originates proximal to a bathroom of the location 402A and can acquire images of a living room and dining area of the location 402A. The image capture device 410 can further acquire images of outdoor areas beyond the location 402A through windows 417A and 417B on the right side of the location 402A.

Continuing with the example of FIG. 11, the contact sensor assembly 406 includes a sensor that can detect the presence or absence of a magnetic field generated by a magnet when the magnet is proximal to the sensor. When the magnetic field is present, the contact sensor assembly 406 generates Boolean sensor data specifying a closed state. When the magnetic field is absent, the contact sensor assembly 406 generates Boolean sensor data specifying an open state. In either case, the contact sensor assembly 406 can communicate sensor data indicating whether the front door of the location 402A is open or closed to the base station 414. The motion sensor assembly 412 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 412 generates Boolean sensor data specifying a still state. When the audio sensor does not detect a reflection because an object is in motion within the monitored space, the motion sensor assembly 412 generates Boolean sensor data specifying an alert state. In either case, the motion sensor assembly 412 can communicate the sensor data to the base station 414. It should be noted that the specific sensing modalities described above are not limiting to the present disclosure. For instance, as one of many potential examples, the motion sensor assembly 412 can base its operation on acquisition of changes in temperature rather than changes in reflected sound waves.

Continuing with the example of FIG. 11, the keypad 408 is configured to interact with a user and interoperate with the other devices disposed in the location 402A in response to interactions with the user. For instance, in some examples, the keypad 408 is configured to receive input from a user that specifies one or more commands and to communicate the specified commands to one or more addressed devices or processes. These addressed devices or processes can include one or more of the devices disposed in the location 402A and/or one or more of the monitor interfaces 430 or the surveillance service 428. The commands can include, for example, codes that authenticate the user as a resident of the location 402A and/or codes that request activation or deactivation of one or more of the devices disposed in the location 402A. Alternatively or additionally, in some examples, the keypad 408 includes a user interface (e.g., a tactile interface, such as a set of physical buttons or a set of virtual buttons on a touchscreen) configured to interact with a user (e.g., receive input from and/or render output to the user). Further still, in some examples, the keypad 408 can receive responses to the communicated commands and render the responses via the user interface as visual or audio output.

Continuing with the example of FIG. 11, the base station 414 is configured to interoperate with other security system devices disposed at the location 402A to provide local command and control and store-and-forward functionality via execution of the surveillance client 436. In some examples, to implement store-and-forward functionality, the base station 414, through execution of the surveillance client 436, receives sensor data, packages the data for transport, and stores the packaged sensor data in local memory for subsequent communication. This communication of the packaged sensor data can include, for instance, transmission of the packaged sensor data as a payload of a message to one or more of the transport services 426 when a communication link to the transport services 426 via the network 418 is operational. In some examples, packaging the sensor data can include filtering the sensor data using one or more filter zones and/or generating one or more summaries (maximum values, average values, changes in values since the previous communication of the same, etc.) of multiple sensor readings. To implement local command and control functionality, the base station 414 executes a variety of programmatic operations through execution of the surveillance client 436 in response to various events. Examples of these events can include reception of commands from the keypad 408, reception of commands from one of the monitor interfaces 430 or the customer interface application 432 via the network 418, or detection of the occurrence of a scheduled event. The programmatic operations executed by the base station 414 via execution of the surveillance client 436 in response to events can include activation or deactivation of one or more of the devices 404, 406, 408, 410, and 412; sounding of an alarm, e.g., in response to receiving an audio signal; reporting an event to the surveillance service 428; and communicating location data to one or more of the transport services 426 to name a few operations. The location data can include data specifying sensor readings (sensor data), configuration data of any of the devices disposed at the location 402A, commands input and received from a user (e.g., via the keypad 408 or a customer interface 432), or data derived from one or more of these data types (e.g., filtered sensor data, summarizations of sensor data, event data specifying an event detected at the location via the sensor data, etc.).

Continuing with the example of FIG. 11, the transport services 426 are configured to receive messages from monitored locations (e.g., the location 402A), parse the messages to extract payloads included therein, and store the payloads and/or data derived from the payloads within one or more data stores hosted in the data center environment 424. In some examples, the transport services 426 expose and implement one or more application programming interfaces (APIs) that are configured to receive, process, and respond to calls from base stations (e.g., the base station 414) via the network 418. Individual instances of a transport service within the transport services 426 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation and/or extensible markup language. These API calls are addressed to one or more uniform resource locators (URLs) that are API endpoints monitored by the transport services 426. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation.

Continuing with the example of FIG. 11, the surveillance service 428 is configured to control overall logical setup and operation of the system 400. As such, the surveillance service 428 can interoperate with the transport services 426, the monitor interfaces 430, the customer interfaces 432, and any of the devices disposed at the location 402A via the network 418. In some examples, the surveillance service 428 is configured to monitor data from a variety of sources for reportable events (e.g., a break-in event) and, when a reportable event is detected, notify one or more of the monitor interfaces 430 and/or the customer interfaces 432 of the reportable event. In some examples, the surveillance service 428 is also configured to maintain state information regarding the location 402A. This state information can indicate, for instance, whether the location 402A is safe or under threat. In certain examples, the surveillance service 428 is configured to change the state information to indicate that the location 402A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 428 is configured to setup and utilize zones. Such setup of the zones can include interacting with monitoring personnel via the monitor interfaces 430, interacting with a customer via a customer interface 432, and/or executing autonomous zone recommendation processes as described herein.

Continuing with the example of FIG. 11, individual monitor interfaces 430 are configured to control computing device interaction with monitoring personnel and to execute a variety of programmatic operations in response to the interactions. For instance, in some examples, the monitor interface 430 controls its host device to provide information regarding reportable events detected at monitored locations, such as the location 402A, to monitoring personnel. Such events can include, for example, movement within an intruder zone or outside a filter zone. Alternatively or additionally, in some examples, the monitor interface 430 controls its host device to interact with a user to configure features of the system 400, such as one or more monitor zones.

Continuing with the example of FIG. 11, individual customer interfaces 432 are configured to control computing device interaction with a customer and to execute a variety of programmatic operations in response to the interactions. For instance, in some examples, the customer interface 432 controls its host device to provide information regarding reportable events detected at monitored locations, such as the location 402A, to the customer. Such events can include, for example, movement within an intruder zone or outside a filter zone. Alternatively or additionally, in some examples, the customer interface 432 is configured to process input received from the customer to activate or deactivate one or more of the devices disposed within the location 402A. Further still, in some examples, the customer interface 432 configures features of the system 400, such as one or more customer zones, in response to input from a user.

Turning now to FIG. 12, an example base station 414 is schematically illustrated. As shown in FIG. 12, the base station 414 includes at least one processor 500, volatile memory 502, non-volatile memory 506, at least one network interface 504, a user interface 512, a battery 514, and an interconnection mechanism 516. The non-volatile memory 506 stores executable code 508 and includes a data store 510. In some examples illustrated by FIG. 12, the features of the base station 414 enumerated above are incorporated within, or are a part of, a housing 518.

In some examples, the non-volatile (non-transitory) memory 506 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 508 stored in the non-volatile memory can include an operating system and one or more applications or programs that are configured to execute under the operating system. Alternatively or additionally, the code 508 can include specialized firmware and embedded software that is executable without dependence upon a commercially available operating system. Regardless, execution of the code 508 can implement the surveillance client 436 of FIG. 11 and can result in manipulated data that is a part of the data store 510.

Continuing the example of FIG. 12, the processor 500 can include one or more programmable processors to execute one or more executable instructions, such as a computer program specified by the code 508, to control the operations of the base station 414. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 502) and executed by the circuitry. In some examples, the processor 500 is a digital processor, but the processor 500 can be analog, digital, or mixed. As such, the processor 500 can execute the function, operation, or sequence of operations using digital values and/or using analog signals. In some examples, the processor 500 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 500 that are multicore can provide functionality for parallel, simultaneous execution of instructions or for parallel, simultaneous execution of one instruction on more than one piece of data.

Continuing with the example of FIG. 12, prior to execution of the code 508 the processor 500 can copy the code 508 from the non-volatile memory 506 to the volatile memory 502. In some examples, the volatile memory 502 includes one or more static or dynamic random access memory (RAM) chips and/or cache memory (e.g. memory disposed on a silicon die of the processor 500). Volatile memory 502 can offer a faster response time than a main memory, such as the non-volatile memory 506.

Through execution of the code 508, the processor 500 can control operation of the network interface 504. For instance, in some examples, the network interface 504 includes one or more physical interfaces (e.g., a radio, an ethernet port, a universal serial bus (USB) port, etc.) and a software stack including drivers and/or other code 508 that is configured to communicate with the one or more physical interfaces to support one or more LAN, PAN, and/or WAN standard communication protocols. The communication protocols can include, for example, transmission control protocol (TCP) and user datagram protocol (UDP) among others. As such, the network interface 504 enables the base station 414 to access and communicate with other computing devices (e.g., the other devices disposed in the location 402A of FIG. 11) via a computer network (e.g., the LAN established by the router 416 of FIG. 11, the network 418 of FIG. 11, and/or a point-to-point connection). For instance, in at least one example, the network interface 504 utilizes sub-GHz wireless networking to transmit wake messages to the other computing devices to request streams of sensor data.

Through execution of the code 508, the processor 500 can control operation of hardware and a software stack including drivers and/or other code 508 that is configured to communicate with other system devices. As such, the base station 414 interacts with other system components in response to received inputs. The input can specify values to be stored in the data store 510. The output can indicate values stored in the data store 510. It should be noted that, in some examples, the base station 414 may include one or more light-emitting diodes (LEDs) to visually communicate information, such as system status or alarm events. Alternatively or additionally, in some examples, the base station 414 includes a 95 db siren that the processor 500 sounds to indicate that a break-in event has been detected.

Continuing with the example of FIG. 12, the various features of the base station 414 described above can communicate with one another via the interconnection mechanism 516. In some examples, the interconnection mechanism 516 includes a communications bus. In addition, in some examples, the battery assembly 514 is configured to supply operational power to the various features of the base station 414 described above. In some examples, the battery assembly 514 includes at least one rechargeable battery (e.g., one or more NiMH or lithium batteries). In some examples, the rechargeable battery has a runtime capacity sufficient to operate the base station 414 for 24 hours or longer while the base station 414 is disconnected from or otherwise not receiving line power. Alternatively or additionally, in some examples, the battery assembly 514 includes power supply circuitry to receive, condition, and distribute line power to both operate the base station 414 and recharge the rechargeable battery. The power supply circuitry can include, for example, a transformer and a rectifier, among other circuitry, to convert AC line power to DC device and recharging power.

Turning now to FIG. 13, an example keypad 408 is schematically illustrated. As shown in FIG. 13, the keypad 408 includes at least one processor 600, volatile memory 602, non-volatile memory 606, at least one network interface 604, a user interface 612, a battery assembly 614, and an interconnection mechanism 616. The non-volatile memory 606 stores executable code 608 and data store 610. In some examples illustrated by FIG. 13, the features of the keypad 408 enumerated above are incorporated within, or are a part of, a housing 618.

In some examples, the respective descriptions of the processor 500, the volatile memory 502, the non-volatile memory 506, the interconnection mechanism 516, and the battery assembly 514 with reference to the base station 414 are applicable to the processor 600, the volatile memory 602, the non-volatile memory 606, the interconnection mechanism 616, and the battery assembly 614 with reference to the keypad 408. As such, those descriptions will not be repeated here.

Continuing with the example of FIG. 13, through execution of the code 608, the processor 600 can control operation of the network interface 604. In some examples, the network interface 604 includes one or more physical interfaces (e.g., a radio, an ethernet port, a USB port, etc.) and a software stack including drivers and/or other code 608 that is configured to communicate with the one or more physical interfaces to support one or more LAN, PAN, and/or WAN standard communication protocols. These communication protocols can include, for example, TCP and UDP, among others. As such, the network interface 604 enables the keypad 408 to access and communicate with other computing devices (e.g., the other devices disposed in the location 402A of FIG. 11) via a computer network (e.g., the LAN established by the router 416).

Continuing with the example of FIG. 13, through execution of the code 608, the processor 600 can control operation of the user interface 612. In some examples, the user interface 612 includes user input and/or output devices (e.g., physical keys arranged as a keypad, a touchscreen, a display, a speaker, a camera, a biometric scanner, an environmental sensor, etc.) and a software stack including drivers and/or other code 608 that is configured to communicate with the user input and/or output devices. As such, the user interface 612 enables the keypad 408 to interact with users to receive input and/or render output. This rendered output can include, for instance, one or more GUIs including one or more controls configured to display output and/or receive input. The input can specify values to be stored in the data store 610. The output can indicate values stored in the data store 610. It should be noted that, in some examples, parts of the user interface 612 (e.g., one or more LEDs) are accessible and/or visible as part of, or through, the housing 618.

Figure 14:
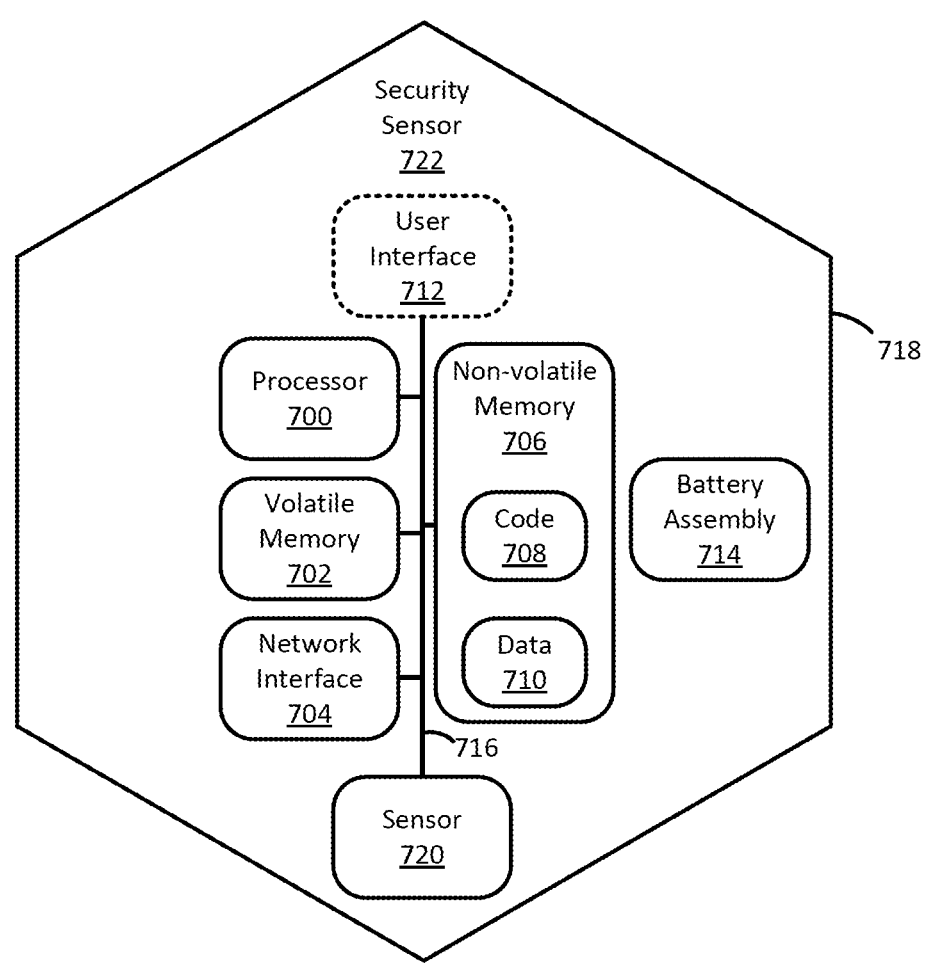
FIG. 14 is a schematic diagram of a security sensor, according to some examples described herein.

Turning now to FIG. 14, an example security sensor assembly 722 is schematically illustrated. Particular configurations of the security sensor assembly 722 (e.g., the image capture devices 404 and 410, the motion sensor assembly 412, and the contact sensor assemblies 406) are illustrated in FIG. 11 and described above. As shown in FIG. 14, the sensor assembly 722 includes at least one processor 700, volatile memory 702, non-volatile memory 706, at least one network interface 704, a battery assembly 714, an interconnection mechanism 716, and at least one sensor 720. The non-volatile memory 706 stores executable code 708 and data store 710. Some examples include a user interface 712. In certain examples illustrated by FIG. 14, the features of the sensor assembly 722 enumerated above are incorporated within, or are a part of, a housing 718.

In some examples, the respective descriptions of the processor 500, the volatile memory 502, the non-volatile memory 506, the interconnection mechanism 516, and the battery assembly 514 with reference to the base station 414 are applicable to the processor 700, the volatile memory 702, the non-volatile memory 706, the interconnection mechanism 716, and the battery assembly 714 with reference to the sensor assembly 722. As such, those descriptions will not be repeated here.

Continuing with the example of FIG. 14, through execution of the code 708, the processor 700 can control operation of the network interface 704 and the user interface 712. In some examples, the network interface 704 includes one or more physical interfaces (e.g., a radio, an ethernet port, a USB port, etc.) and a software stack including drivers and/or other code 708 that is configured to communicate with the one or more physical interfaces to support one or more LAN, PAN, and/or WAN standard communication protocols. The communication protocols can include, for example, TCP and UDP, among others. As such, the network interface 704 enables the sensor assembly 722 to access and communicate with other computing devices (e.g., the other devices disposed in the location 402A of FIG. 11) via a computer network (e.g., the LAN established by the router 416). For instance, in at least one example, when executing the code 708, the processor 700 controls the network interface to stream (e.g., via UDP) sensor data acquired from the sensor assembly 720 to the base station 414. Alternatively or additionally, in at least one example, through execution of the code 708, the processor 700 can control the network interface 704 to enter a power conservation mode by powering down a 2.4 GHz radio and powering up a sub-GHz radio that are both included in the network interface 704. In this example, through execution of the code 708, the processor 700 can control the network interface 704 to enter a streaming mode by powering up a 2.4 GHz radio and powering down a sub-GHz radio, for example, in response to receiving a wake signal from the base station via the sub-GHz radio.

Continuing with the example of FIG. 14, through execution of the code 708, the processor 700 can control operation of the sensor assembly 722. In some examples, the sensor assembly 722 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 708 that is configured to communicate with the user input and/or output devices. As such, the sensor assembly 722 enables the sensor assembly 722 to interact with users to receive input and/or render output. This rendered output can include, for instance, one or more GUIs including one or more controls configured to display output and/or receive input. The input can specify values to be stored in the data store 710. The output can indicate values stored in the data store 710. It should be noted that, in some examples, parts of sensor assembly 722 are accessible and/or visible as part of, or through, the housing 718.

Continuing with the example of FIG. 14, the sensor assembly 720 can include one or more types of sensors, such as the sensors described above with reference to the image capture devices 404 and 410, the motion sensor assembly 412, and the contact sensor assembly 406 of FIG. 11, or other types of sensors. For instance, in at least one example, the sensor assembly 720 includes an image capture device and a temperature sensor. Regardless of the type of sensor or sensors housed, the processor 700 can (e.g., via execution of the code 708) acquire sensor data from the housed sensor and stream the acquired sensor data to the processor 700 for communication to the base station.

It should be noted that, in some examples of the devices 600 and 700, the operations executed by the processors 600 and 700 while under the respective control of the code 608 and 708 may be hardcoded and/or implemented in hardware, rather than as a combination of hardware and software.

Figure 15:
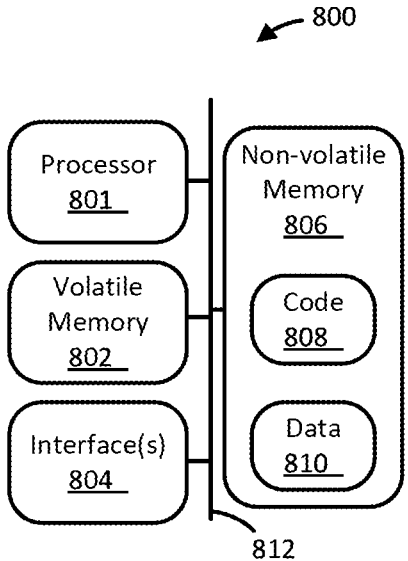
FIG. 15 is a schematic diagram of a computing device, according to some examples described herein.

Turning now to FIG. 15, a computing device 800 is illustrated schematically. As shown in FIG. 15, the computing device includes at least one processor 801, volatile memory 802, one or more interfaces 804, non-volatile memory 806, and an interconnection mechanism 812. The non-volatile memory 806 includes code 808 and at least one data store 810.

In some examples, the non-volatile (non-transitory) memory 806 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 808 stored in the non-volatile memory can include an operating system and one or more applications or programs that are configured to execute under the operating system. Alternatively or additionally, the code 808 can include specialized firmware and embedded software that is executable without dependence upon a commercially available operating system. Regardless, execution of the code 808 can result in manipulated data that may be stored in the data store 810 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 15, the processor 801 can be one or more programmable processors to execute one or more executable instructions, such as a computer program specified by the code 808, to control the operations of the computing device 800. As used herein, the term "processor"

describes circuitry that executes a function, an operation, or a sequence of operations. The function, operation, or sequence of operations can be hard coded into the circuitry or soft coded by way of instructions held in a memory device (e.g., the volatile memory 802) and executed by the circuitry. In some examples, the processor 801 is a digital processor, but the processor 801 can be analog, digital, or mixed. As such, the processor 801 can execute the function, operation, or sequence of operations using digital values and/or using analog signals. In some examples, the processor 801 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 801 that are multicore can provide functionality for parallel, simultaneous execution of instructions or for parallel, simultaneous execution of one instruction on more than one piece of data.

Continuing with the example of FIG. 15, prior to execution of the code 808 the processor 801 can copy the code 808 from the non-volatile memory 806 to the volatile memory 802. In some examples, the volatile memory 802 includes one or more static or dynamic random access memory (RAM) chips and/or cache memory (e.g. memory disposed on a silicon die of the processor 801). Volatile memory 802 can offer a faster response time than a main memory, such as the non-volatile memory 806.

Through execution of the code 808, the processor 801 can control operation of the interfaces 804. The interfaces 804 can include network interfaces. These network interfaces can include one or more physical interfaces (e.g., a radio, an ethernet port, a USB port, etc.) and a software stack including drivers and/or other code 808 that is configured to communicate with the one or more physical interfaces to support one or more LAN, PAN, and/or WAN standard communication protocols. The communication protocols can include, for example, TCP and UDP among others. As such, the network interfaces enable the computing device 801 to access and communicate with other computing devices via a computer network.

The interfaces 804 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 808 that is configured to communicate with the user input and/or output devices. As such, the user interfaces enable the computing device 801 to interact with users to receive input and/or render output. This rendered output can include, for instance, one or more GUIs including one or more controls configured to display output and/or receive input. The input can specify values to be stored in the data store 810. The output can indicate values stored in the data store 810.

Continuing with the example of FIG. 15, the various features of the computing device 800 described above can communicate with one another via the interconnection mechanism 812. In some examples, the interconnection mechanism 812 includes a communications bus.

Figure 16:
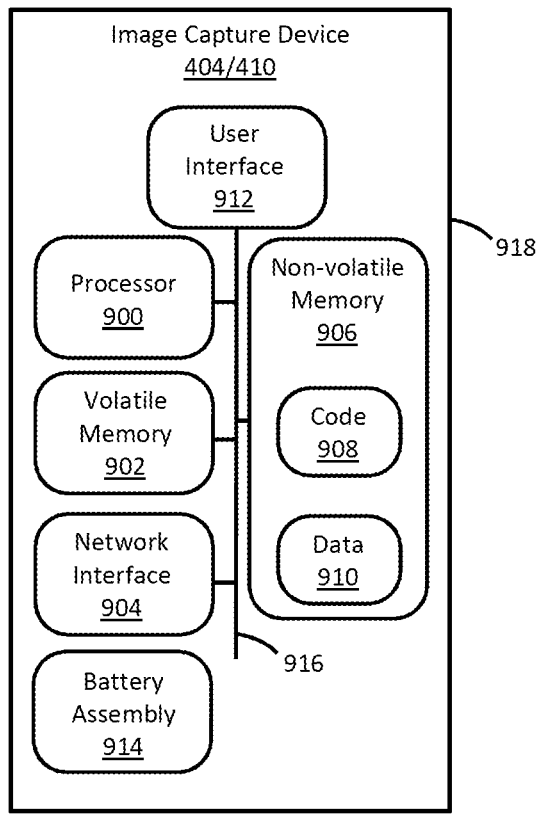
FIG. 16 is a schematic diagram of an image capture device, according to some examples described herein.

Turning now to FIG. 16, an example image capture device 404/410 is schematically illustrated. As shown in FIG. 16, the image capture device 404/410 includes at least one processor 900, volatile memory 902, non-volatile memory 906, at least one network interface 904, a user interface 912, a battery assembly 914, and an interconnection mechanism 916. The non-volatile memory 906 stores executable code

908 and data store 910. In some examples illustrated by FIG. 16, the features of the image capture device 404/410 enumerated above are incorporated within, or are a part of, a housing 918.

Various concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. An assembly comprising:
   an apparatus comprising:
   a speaker including a diaphragm configured to generate acoustic waves defining an alarm tone; and
   a housing enclosing the speaker and including at least one first opening, the speaker being positioned within the housing such that a front chamber is between the diaphragm and the at least one first opening, wherein the acoustic waves exit from the apparatus through the at least one first opening; and a resonator device coupled to the housing and comprising a body having an aperture, a cavity, and at least one second opening open to atmosphere, the cavity being positioned adjacent to the housing and configured to receive the acoustic waves through the aperture, wherein the acoustic waves exit from the resonator device through the at least one second opening, and wherein the aperture, the cavity, and the at least one second opening are sized to collectively generate an increased output of the assembly having a resonance frequency within a frequency range of the alarm tone.

2. The assembly of claim 1, wherein a combination of the apparatus and the resonator device defines a resonator having the resonance frequency that is within the frequency range of the alarm tone.

3. The assembly of claim 1, wherein the front chamber and the cavity are coupled so that the at least one first opening, the aperture, and the at least one second opening are configured to collectively generate, with the front chamber and the cavity, a peak output of the assembly within the frequency range of the alarm tone.

4. The assembly of claim 1, wherein the at least one first opening comprises a plurality of openings, the at least one second opening comprises a plurality of openings, or the at least one first opening and the at least one second opening both comprise a plurality of openings.

5. The assembly of claim 1, wherein the frequency range of the alarm tone falls within a range from 2.0 kHz to 4.0 kHz.

6. The assembly of claim 1, wherein the acoustic waves further comprise speech.

7. An assembly comprising:

a loudspeaker configured to generate acoustic waves; and a device positioned adjacent to the loudspeaker, the device comprising a body having an aperture, a cavity, and at least one opening open to atmosphere, the aperture being configured to receive the acoustic waves from the loudspeaker in a first direction, and the cavity being configured to redirect the acoustic waves through the at least one opening in a second direction different from the first direction, wherein the acoustic waves define an alarm tone and the assembly defines a resonator having a resonance frequency that is within a frequency range of the alarm tone.

8. The assembly of claim 7, wherein the cavity comprises a curved portion positioned opposite the at least one opening.

9. The assembly of claim 7, wherein the second direction is oriented at an angle of between 1° to 90° with respect to the first direction.

10. The assembly of claim 7, further comprising a housing that encloses the loudspeaker and includes a camera and a camera lens that captures light along an optical axis, wherein the second direction is parallel to the optical axis.

11. The assembly of claim 7, wherein the device further comprises a mounting structure configured to mount the body to a housing located between the body and the loudspeaker.

12. The assembly of claim 11, wherein the mounting structure comprises a retention ring configured to fit over a portion of the housing.

13. The assembly of claim 11, wherein the housing comprises an opening and wherein the mounting structure comprises one or more retention clips configured to be received in an opening of the housing.

14. The assembly of claim 11, wherein the mounting structure comprises one or more second apertures formed in the body and one or more fasteners configured to be received in the one or more second apertures.

15. A method comprising:

providing an apparatus comprising a speaker and a housing, the speaker configured to generate acoustic waves defining an alarm tone, and the housing enclosing the speaker and including at least one first opening, the at least one first opening being located within the housing such that a front chamber is defined between the speaker and the at least one first opening, wherein the acoustic waves exit from the apparatus through the at least one first opening;

providing a device including a body, the body having an aperture, a cavity, and at least one second opening open to atmosphere; and positioning the apparatus relative to the device to enable the cavity to receive through the aperture the acoustic waves generated by the speaker and allow the acoustic waves to exit from the device through the at least one second opening, so that the aperture, the cavity and the at least one second opening collectively create, with the front chamber and the at least one first opening, a resonator that generates an increased output of the assembly within a frequency range of an output of the speaker corresponding to the alarm tone.

16. The method of claim 15, wherein the front chamber and the at least one first opening collectively define a first resonator when the apparatus is used without the device and wherein the resonator defined by the front chamber, the at least one first opening, the aperture, the cavity, and the at least one second opening comprises a second resonator, the method further comprising:

prior to positioning the apparatus relative to the device, determining a resonance frequency of the first resonator, wherein the resonance frequency of the first resonator is different from the resonance frequency of the second resonator and does not fall within the frequency range of the output of the speaker corresponding to the alarm tone; and based on the resonance frequency of the first resonator, altering the body to raise or lower the resonance frequency of the second resonator, such that the resonance frequency of the second resonator falls within the frequency range of the output of the speaker corresponding to the alarm tone.

17. The method of claim 15, further comprising defining one or more parameters of the device such that the aperture, the cavity, and the at least one second opening collectively create, with the front chamber and the at least one first opening, the resonator that generates the increased output of the assembly within the frequency range of the output of the speaker corresponding to the alarm tone.

18. The method of claim 17, wherein the at least one second opening comprises a slot and a plurality of openings, wherein the one or more parameters comprise at least one of a volume of the cavity, a length of the slot, or a length of the plurality of the openings, the method further comprising:

when the resonance frequency is to be decreased, increasing at least one of the volume of the cavity, the length of the slot, or the length of the plurality of the openings; and when the resonance frequency is to be increased, decreasing at least one of the volume of the cavity, the length of the slot, or the length of the plurality of the openings.

19. The method of claim 17, wherein the at least one second opening comprises a slot and a plurality of openings, wherein the one or more parameters comprise at least one of a cross-sectional area of the slot, a diameter of the plurality of openings, or a number of the plurality of openings, the method further comprising:

when the resonance frequency is to be decreased, decreasing at least one of the cross-sectional area of the slot, the diameter of the plurality of openings, or the number of the plurality of openings; and when the resonance frequency is to be increased, increasing at least one of the cross-sectional area of the slot, the diameter of the plurality of openings, or the number of the plurality of openings.

20. The assembly of claim 7, wherein the frequency range of the alarm tone falls within a range from 2.0 kHz to 4.0 kHz.

21. The assembly of claim 15, wherein the frequency range of the alarm tone falls within a range from 2.0 kHz to 4.0 kHz.

* * * * *